US012146639B1

(12) United States Patent
Cai

(10) Patent No.: US 12,146,639 B1
(45) Date of Patent: Nov. 19, 2024

(54) LAMP AND ELONGATED GLASS TUBE LIGHT SOURCE THEREOF

(71) Applicant: Zhou Cai, Gangdong (CN)

(72) Inventor: Zhou Cai, Gangdong (CN)

( * ) Notice: Subject to any disclaimer, the term of this patent is extended or adjusted under 35 U.S.C. 154(b) by 0 days.

(21) Appl. No.: 18/370,885

(22) Filed: Sep. 21, 2023

(51) Int. Cl.

| | |
|---|---|
| ***F21V 17/04*** | (2006.01) |
| ***F21V 7/00*** | (2006.01) |
| ***F21V 14/00*** | (2018.01) |
| ***F21V 19/00*** | (2006.01) |
| ***F21V 29/70*** | (2015.01) |
| *F21Y 103/10* | (2016.01) |
| *F21Y 115/15* | (2016.01) |

(52) U.S. Cl.
CPC .............. *F21V 17/04* (2013.01); *F21V 7/005* (2013.01); *F21V 14/006* (2013.01); *F21V 19/0085* (2013.01); *F21V 29/70* (2015.01); *F21Y 2103/10* (2016.08); *F21Y 2115/15* (2016.08)

(58) Field of Classification Search
CPC .......... F21V 17/04; F21V 29/70; F21V 7/005; F21V 14/006; F21V 19/0085; F21Y 2103/10
See application file for complete search history.

(56) References Cited

U.S. PATENT DOCUMENTS 5,539,622 A * 7/1996 Ishikawa ................ G03B 15/05 362/18
5,642,933 A * 7/1997 Hitora ..................... F21S 8/083 362/348
11,085,592 B1 * 8/2021 Wang .................... F21V 23/045
2011/0089805 A1 * 4/2011 Betsuda .................. F21V 29/76 313/46
2015/0092435 A1 * 4/2015 Yamamura ............. B60Q 1/085 362/512
2016/0270164 A1 * 9/2016 Xiong .................... H05B 47/24
2016/0290609 A1 * 10/2016 Jiang ........................ F21K 9/235
2016/0334066 A1 * 11/2016 Yuan ...................... F21V 23/003
2016/0369949 A1 * 12/2016 Wu ........................ F21V 3/0615
2017/0160542 A1 * 6/2017 Mouri ................ G02B 27/0006
2017/0181239 A1 * 6/2017 Xiong ........................ F21K 9/27
2021/0116077 A1 * 4/2021 Jiang ..................... F21V 19/005

FOREIGN PATENT DOCUMENTS

CN 202561464 * 12/2011
CN 113660848 A * 11/2021
KR 20100004617 A * 7/2008

* cited by examiner

*Primary Examiner* — Fatima N Farokhrooz
(74) *Attorney, Agent, or Firm* — Ying-Ting Chen

(57) ABSTRACT

A lamp includes an elongated tube glass light source which includes an elongated tube glass, a light emitting unit and a reflecting element, wherein the light emitting unit and the reflecting element are located within the elongated glass tube, and the reflecting element includes a reflecting layer, wherein light reaching the reflecting layer of the reflecting element is reflected and emitted from a light emission area of the elongated glass tube. The reflecting surface is formed through silver plating, the reflectivity is high and reaches 95%, and therefore the reflecting efficiency is higher, and the light energy utilization efficiency is higher. An inert gas is filled in the elongated glass tube light source to prevent the reflecting surface formed by silver plating from being vulcanized and blackened, so that the performance of the reflecting element is more durable.

14 Claims, 19 Drawing Sheets

LAMP AND ELONGATED GLASS TUBE LIGHT SOURCE THEREOF

BACKGROUND OF THE PRESENT INVENTION

Field of Invention

The present invention relates to a lighting device, and more particularly to a lamp and its elongated glass tube light source which can increase the luminous efficiency by improving the reflection efficiency, and improve the heat dissipation performance and reduce the dazzle light.

Description of Related Arts

A straight glass tube lamp is a type of lamp that uses an ordinary glass tube as the main structure. Compared to the current aluminum-plastic tube lamp, it has the following advantages: because the light transmittance of glass is higher than that of PC cover, it has better whiteness and is more conducive to light output. The glass tube does not turn yellow after long-term exposure to light, and is more resistant to dirt and corrosion, and is more durable.

A current conventional straight glass tube LED lamp generally comprises a lamp holder, an elongated glass tube, a reflector board, a lamp strip aluminum substrate, LED lamp beads, and a driving power supply. One end of the lamp strip aluminum substrate is equipped with the driving power supply, and the LED lamp beads are arranged on the lamp strip aluminum substrate. The back of the lamp strip aluminum substrate is equipped with the semi-enclosed reflector which converges the light emitted by the LED lamp beads, so as to allow the divergent light to converge and illuminate an illumination area, thereby improving the brightness of the illumination area. The lamp strip aluminum substrate is pasted on the groove of the reflector board with a thermal conductive glue, and the reflector board is pasted on the inner wall of the circular glass lamp tube with a thermal conductive glue. The structure of the reflector board in this conventional elongated glass tube LED lamp is generally made of mirror aluminum, or a based with a chrome-plated film or a chromium-plated film, and its reflectivity is not high and is easy to cause a waste of light energy.

SUMMARY OF THE PRESENT INVENTION

The present invention is to solve the above-mentioned technical problem and provide an elongated tube glass light source, comprising:

- an elongated tube glass, wherein the elongated glass tube has an light emission area;
- a light emitting unit; and
- a reflecting element, wherein the light emitting unit and the reflecting element are located within the elongated glass tube, and the reflecting element comprises a reflecting layer, wherein light emitted from the light emitting unit and reaching the reflecting layer of the reflecting element is reflected and emitted from the light emission area of the elongated glass tube.

Preferably, the elongated glass tube light source comprises a substrate which is bent and placed in the elongated glass tube to form a light source cavity and a heat dissipation cavity, wherein the light source cavity and the heat dissipation cavity are filled with an inert gas or a mixture of an inert gas and oxygen, wherein the light emitting unit and the reflecting element are located in the light source cavity, and the reflecting layer is formed by a silver-plated layer.

Preferably, the substrate has thermal conductivity, and after being bent, the substrate forms a mounting portion and an wall attaching portion, wherein the mounting portion forms the light source cavity between the mounting portion and the light emission area of the elongated glass tube, and the wall attaching portion forms the heat dissipation cavity between the mounting portion and the wall attaching portion, wherein the light emitting unit and the light emitting element are installed on the mounting portion, and the wall attaching portion is attached to an inner wall of the heat dissipation area of the elongated glass tube to conduct heat.

Preferably, the mounting portion forms a light source mounting part and a reflecting element mounting part after being bent, wherein the light emitting unit is installed on the light source mounting part and faces the reflecting element mounting part, and the reflecting element is formed on the reflecting element mounting part.

Preferably, the reflective part comprises a first part, a second part, and a third part, wherein the first part of the reflecting element mounting part forms an acute angle with the light source mounting part, the second part is extended integrally towards the light emission area of the elongated glass tube from the first part and forms an obtuse angle with the first part, the third part is extended integrally towards the light emission area of the elongated glass tube from the second part and is attached to the inner wall of the elongated glass tube at an end of the third part, the third part also forms an obtuse angle with the second part, and ends of the third part and the light source mounting part form an opening to define the light emission area of the elongated glass tube.

Preferably, the mounting portion is bent to form the light source mounting part and two reflecting element mounting parts, wherein the light emitting unit is mounted on the light source mounting part and faces towards the light emission area of the elongated glass tube, and the reflecting element is formed on the two reflecting element mounting parts, wherein the two reflecting element mounting parts are extended obliquely towards the light emission area of the elongated glass tube from both ends of the light source mounting part, and each reflecting element mounting part forms an obtuse angle with the light source mounting part, wherein ends of the two reflecting element mounting parts form an opening to define the light emission area of the elongated glass tube.

Preferably, the mounting portion is bent to form a light source mounting part, a reflecting element mounting part, and an extension part, wherein the light emitting unit is installed on the light source mounting part and faces the reflecting element mounting part, wherein the reflecting element is formed on the reflecting element mounting part, and the reflecting element mounting part and the extension part are extended from two ends of the light source mounting part after being bent, and ends of the reflecting element mounting part and the extension part form an opening to define the light emission area of the elongated glass tube.

Preferably, the elongated glass tube light source further comprises a condensing element installed on the reflecting element mounting part to converge the light generated by the light emitting unit.

Preferably, the condensing element is a wave-shaped longitudinal condensing lens, and the reflecting element mounting part is divided into two parts after being bent, with the condensing element is provided in a transition area between the two parts.

Preferably, the light emitting unit comprises a plurality of light emitting elements arranged along the length direction of the elongated glass tube, and the light emitting elements are fluorescent lamps, LEDs, or OLEDs.

Preferably, the inert gas is helium.

The present invention further provides a lamp comprising a mounting frame and one or more of the aforementioned elongated glass tube light sources installed on the mounting frame.

The present invention further provides a method for manufacturing an elongated glass tube light source, comprising the following steps.

(a) Install a light emitting unit on a substrate and form a reflecting element on the substrate.

(b) Place the substrate into an elongated glass tube.

(c) Fill the elongated glass tube with an inert gas.

The present invention further provides a method for emitting light from an elongated glass tube light source, comprising the following steps.

(A) Emit light from a light emitting unit in the elongated glass tube.

(B) Reflect at least a portion of the light emitted from the light emitting unit reaching a reflecting layer of a reflecting element towards a light emission area of the elongated glass tube, wherein the elongated glass tube is filled with the inert gas.

The prevent invention comprises the following advantageous effects.

First of all, the reflecting element of the present invention has a high reflectivity of 95% due to the silver-plated reflective surface, it is higher in reflectivity and light energy utilization efficiency compared to the reflective films made of other materials in the prior art.

Secondly, the elongated glass tube light source is filled with an inert gas to prevent the silver-plated reflective surface from sulfidation and blackening, thereby ensuring the durability of the reflecting element.

Thirdly, the inert gas filled in the elongated glass tube light source can be added with oxygen to neutralize the halogen gas sulfur emitted at high temperature by the residual flux of the soldering flux.

Fourthly, the brightness distribution of the illumination light emitted by the lamp incorporated with multiple elongated glass tube light sources is relatively uniform and has the characteristic of low dazzle and glare light.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
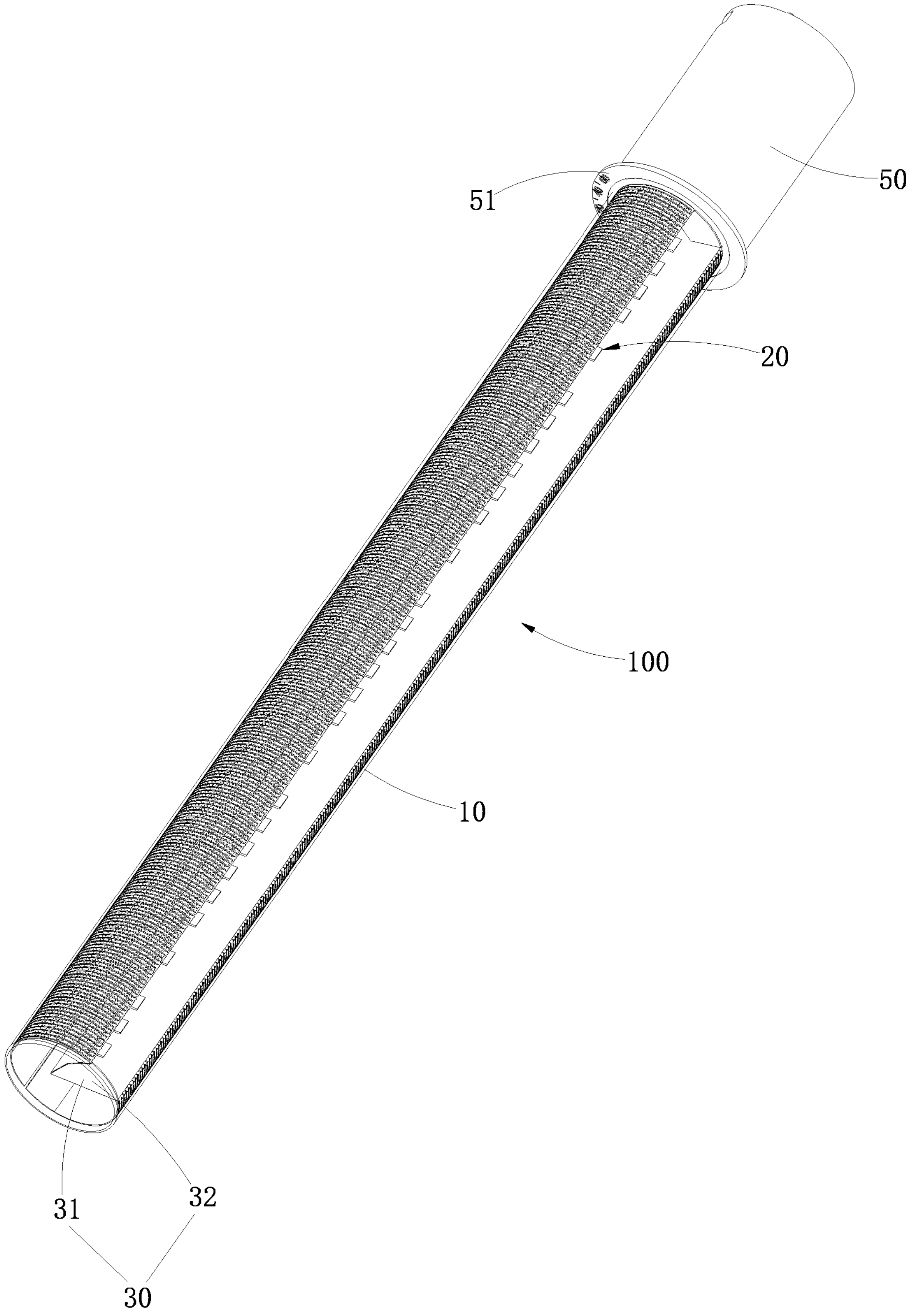
FIG. 1 is a perspective view of an elongated glass tube light source according to a first preferred embodiment of the present invention.
Figure 2:
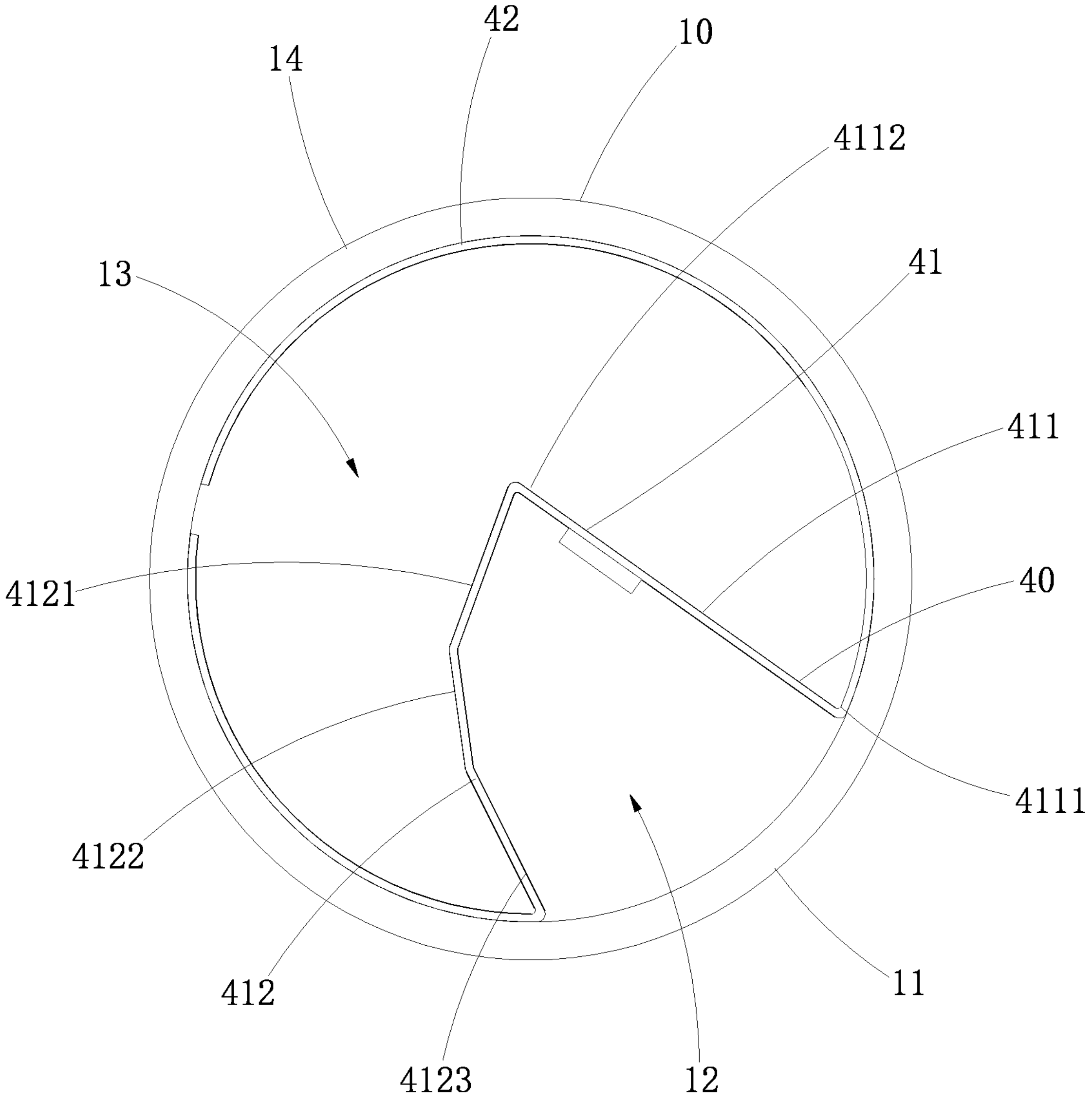
FIG. 2 is a sectional view of the elongated glass tube light source according to the above first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper." "front." "back." "left," "right." "perpendicular." "horizontal," "top." "bottom," "inner." "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIGS. 1 to 5, a lamp 1000 and its elongated glass tube light source 100 according to a first preferred embodiment of the present invention are illustrated. The elongated glass tube light source 100 comprises an elongated glass tube 10, a light emitting unit 20, and a reflecting element 30. The elongated glass tube 10 has a light emission area 11, and the light emitting unit 20 is located in the elongated glass tube 10 and comprises one or more light emitting elements 21 and other components such as a driving circuit. The light emitting elements 21 can be various light sources, such as fluorescent lamps, LEDs, OLEDs, etc. The reflecting element 30, which is also located in the elongated glass tube 10, is used to reflect the light generated by the light emitting unit 20, so as to project the light from the light emission area 11 of the elongated glass tube 10 to the desired area. In this embodiment, the light emitting unit 20 preferably comprises a plurality of light emitting elements 21 arranged in a row or multiple rows along the length direction of the elongated glass tube 10.

It can be understood that the elongated glass tube 10 forms a light source cavity 12 in which the light emitting unit 20 is located. When the light emitting unit 20 is in operation to generate light, the light reaching the reflecting element 30 is reflected and emitted from the light emission area 11 of the elongated glass tube 10, so that the light projects out from the elongated glass tube light source 100.

The reflecting element 30 comprises a reflecting layer 31 which is formed by a silver-plated layer. It can be understood that the silver-plated layer has a high reflectivity that is reaching 95%. Therefore, when the light generated by the light emitting unit 30 reaches the reflecting layer 31 formed by the silver-plated layer, it can be reflected and directed towards the light emission area 11 of the elongated glass tube 10, so that compared to other reflective films made of different materials in the prior art, the reflectivity is higher and the light energy utilization efficiency is higher.

In this embodiment of the present invention, the reflecting element 30 has a higher reflectivity because it adopts the silver-plated layer. However, silver is prone to sulfide and turn black in the air, so it has not been applied to the reflective component of the elongated glass tube light source in the prior art. In the present invention, the light source cavity 12 is filled with inert gases such as nitrogen or helium to prevent sulfidation of the silver-plated layer.

It can be understood that in order to ensure the effect of sulfurization prevention, the internal space of the elongated glass tube 10 is filled with an inert gas such as nitrogen or helium. Additionally, oxygen can be added to the inert gas to neutralize the sulfur gas emitted at high temperatures by the residual flux in the solder. Furthermore, helium is preferably used as the inert gas due to its excellent heat transfer performance which assists in heat dissipation. It is worth mentioning that if the elongated glass tube light source 100 uses halogen-free solder paste during the soldering process or the residual halogen-containing solder paste has been removed, oxygen can be omitted to avoid affecting the heat transfer performance of helium.

In this embodiment of the present invention, the elongated glass tube light source 100 comprises a substrate 40*m* which is bent and placed inside the elongated glass tube 10, and the internal space of the elongated glass tube 10 forms two cavities, namely a light source cavity 12 and a heat dissipation cavity 13. The reflecting element 30 is formed on the side surface of the substrate 40 facing the light source cavity 12, and the light emitting unit 20 is placed in the light source cavity 12. Both the light source cavity 12 and the heat dissipation cavity 13 are filled with helium or a mixture of helium and oxygen to prevent sulfurization of the reflecting layer 31 of the reflecting element 30.

The substrate 40 is made of a thermally conductive metal material, and in this embodiment, it is implemented as a copper plate. The substrate 40 comprises a mounting portion 41 and an wall attaching portion 42 which are integrally extended from each other. The mounting portion 41 is extended into the elongated glass tube 10 for mounting the reflecting element 30 and the light emitting unit 20, and divides the internal space of the elongated glass tube 10 into the light source cavity 12 and the heat dissipation cavity 13. The wall attaching portion 42 is formed by bending the substrate 40 and is attached to the inner wall of the elongated glass tube 10 to conduct heat. More specifically, except for the light emission area 11, the remaining portion of the elongated glass tube 10 forms a heat dissipation area 14, and the wall attaching portion 42 is attached to the inner wall of the heat dissipation area 14 of the elongated glass tube 10 for heat dissipation.

The wall attaching portion 42 facing the inner wall of the elongated glass tube 10 may have a groove, which is formed by etching a copper sheet, the wall attaching portion 42 has a protrusion on one side facing the inner wall of the elongated glass tube 10, and the protrusion contacts the inner wall of the elongated glass tube 10 to conduct heat. The thickness of the wall attaching portion 42 can be 0.2-0.5 mm, and the groove depth can be 0.03-0.1 mm. For example, the thickness of the wall attaching portion 42 is 0.3 mm, and the groove depth is 0.05 mm.

The mounting portion 41 of the substrate 40 comprises a light source mounting part 411 and a reflecting element mounting part 412. The mounting portion 41 of the substrate 40 forms the light source mounting part 411 and the reflecting element mounting part 412 after bending. In this embodiment, the light source mounting part 411 is extended along a chord length of the elongated glass tube 10, and one end thereof is attached to the inner wall of the elongated glass tube 10. In other words, the substrate 40 integrally forms the wall attaching portion 42 after bending at the wall near end 4111 of the light source mounting part 411, and forms the reflecting element mounting part 412 after bending at the wall away end 4112 of the light source mounting part 411.

The reflecting element 30 comprises a mirror base 32 which can be a mirror copper foil, and the reflecting layer 31 formed by the silver plating is formed on the mirror base 32. Then, the reflecting element mounting part 412 of the substrate 40 is thermally pressed together to form an integral structure.

The reflecting element mounting part 412 of the mounting portion 41 of the substrate 40 in this embodiment comprises multiple parts after being bent, such as three parts. Specifically, the reflecting element mounting part 412 comprises a first part 4121, a second part 4122, and a third part 4123. The first part 4121 of the reflecting element mounting part 412 forms an acute angle with the light source mounting part 411. The second part 4122 is extended integrally in the direction towards the light emission area 11 of the elongated glass tube 10 from the first part 4121 and forms an obtuse angle with the first part 4121. The third part 4123 is extended integrally in the direction towards the light emission area 11 of the elongated glass tube 10 from the second part 4122, and the end of the third part 4123 is attached to the inner wall of the elongated glass tube 10. The third part 4123 also forms an obtuse angle with the second part 4122.

In this embodiment, the light emitting unit 20 is mounted facing the reflecting element mounting part 412 on the substrate 40 at the light source mounting part 411. The reflecting element 30 comprises the reflecting layer 31 formed by silver plating on the copper substrate of the reflecting element mounting part 412. The mounting portion 41 of the substrate 40 forms an opening 43 between two ends, and the light emission area 11 of the elongated glass tube 10 corresponds to the opening 43.

Figure 3:
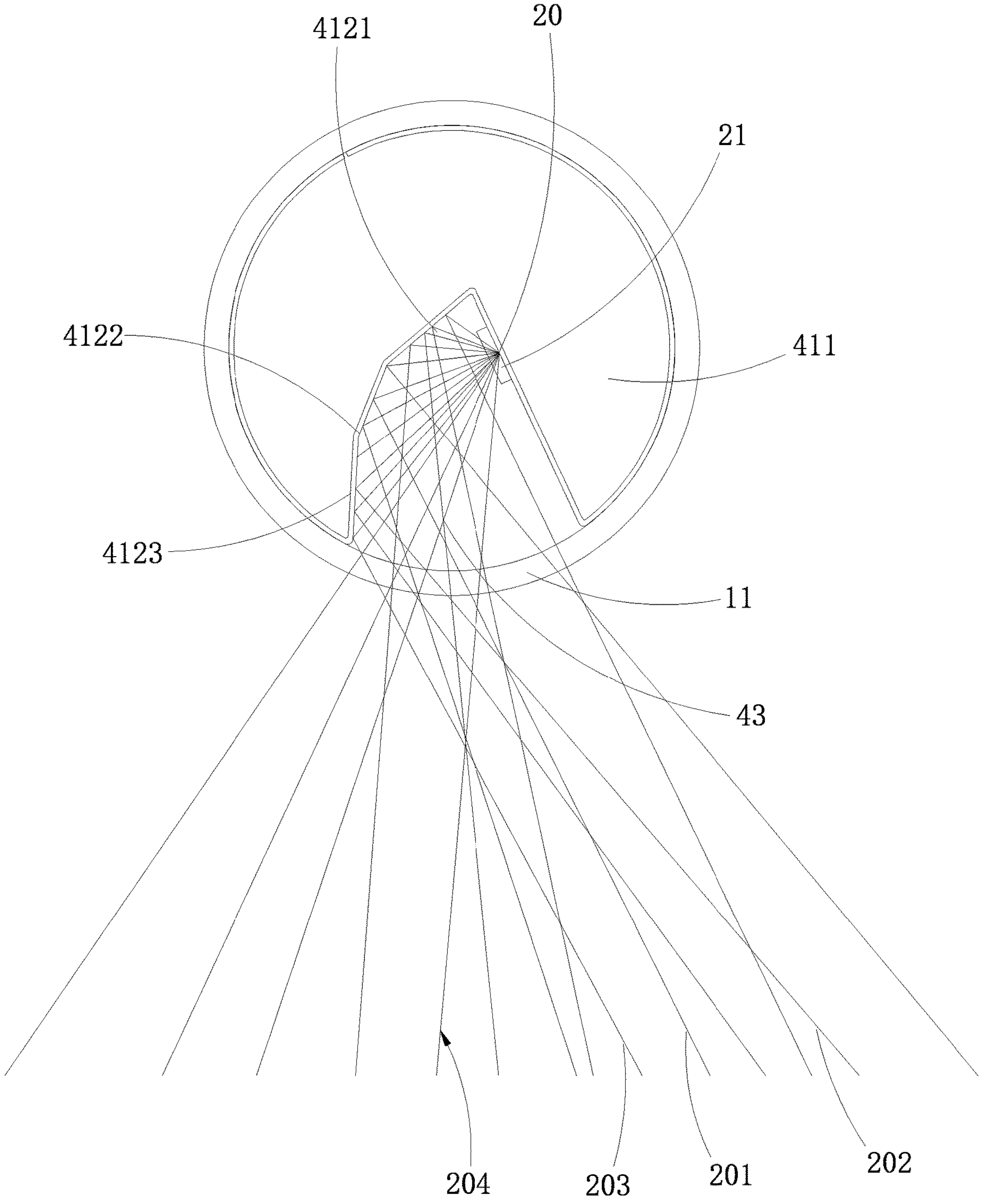
FIG. 3 is a schematic view illustrating the elongated glass tube light source in the light emitting state according to the above first preferred embodiment of the present invention.

As shown in FIG. 3, for the light emitted by the light emitting unit 20, a first part light 201 reaches the reflecting layer 31 of the reflecting element 30 on the first part 4121 of the reflecting element mounting part 412 corresponding thereto and is reflected towards the light emission area 11 of the elongated glass tube 10, a second part light 202 reaches the reflecting layer 31 of the reflecting element 30 on the second part 4122 of the reflecting element mounting part 412 corresponding thereto and is reflected towards the light emission area 11 of the elongated glass tube 10, a third part light 203 reaches the reflecting layer 31 of the reflecting element 30 on the third part 4123 of the reflecting element mounting part 412 corresponding thereto and is reflected towards the light emission area 11 of the elongated glass tube 10, and a fourth part light 204 is directly emitted towards the light emission area 11 of the elongated glass tube 10. Due to the silver-plated reflecting layer 31 of the reflecting element 30, the reflection efficiency is high, and the first part light 201, the second part light 202, the third part light 203, and the fourth part light 204 generated by the light emitting unit 20 can all be effectively utilized.

In addition, the elongated glass tube light source 100 further comprises a mounting head 50, and the elongated glass tube 10 is rotatably mounted on the mounting head 50, thereby allowing adjustment of the position of the elongated glass tube 10 to adjust the position of the light emission area 11 of the elongated glass tube 10, so as to adjust the projection direction of the light 201, 202, 203, and 204 emitted by the light emitting unit 20. An angle adjustment indicator 51 can be provided on the mounting head 50, such as an angle adjustment scale, to indicate the position of adjustment.

It can be understood that the elongated glass tube light source 100 of the present invention utilizes the substrate 10 with high heat dissipation performance, achieves high reflection efficiency through the reflecting element 30, and emits light from the light emission area 11 of the elongated glass tube 10 generated by the light emitting unit 20, thereby achieving illumination with a small angle in a single direction by adjusting the size of the light emission area 11, and the light is converged and effectively utilized, which can effectively prevent the generation of string light.

Correspondingly, the present invention provides a manufacturing method for the elongated glass tube light source 100, which comprises the steps of:

mounting the light emitting unit 20 on the substrate 40 and forming the reflecting element 30 on the substrate 40;

placing the substrate 40 into the elongated glass tube 10; and filling the elongated glass tube 10 with an inert gas or a mixture of an inert gas and oxygen.

More specifically, the substrate 40 is bent to form the mounting portion 41 and the wall attaching portion 42, and then the bent substrate 40 is placed into the elongated glass tube 10.

Alternatively, the substrate 40 is first bent to form the mounting portion 41 and the wall attaching portion 42, and then the light emitting unit 20 is mounted on the mounting portion 41 and the reflecting element 30 is formed on the mounting portion 41.

More specifically, the above method further comprises the steps of: bending the mounting portion 41 to form the light source mounting part 411 and the reflecting element mounting part 412, then mounting the light emitting unit 20 on the light source mounting part 411 of the mounting portion 41, and forming the reflecting element 30 on the reflecting element mounting part 412 of the mounting portion 41 by silver plating.

Alternatively, before the mounting portion 41 is bent, the light emitting unit 20 is mounted on the light source mounting part 411 of the mounting portion 41, the reflecting element 30 is formed on the reflecting element mounting part 412 of the mounting portion 41, and then the mounting portion 41 is bent to form the bent extension of the light source mounting part 411 and the reflecting element mounting part 412.

The above method further comprises the step of further bending the reflecting element mounting part 412 of the mounting portion 41 to form the first part 4121, the second part 4122, and the third part 4123, wherein the first part 4121 of the reflecting element mounting part 412 forms an acute angle with the light source mounting part 411, the second part 4122 is extended integrally towards the light emission area 11 of the elongated glass tube 10 from the first part 4121 and forms an obtuse angle with the first part 4121, the third part 4123 is extended integrally towards the light emission area 11 of the elongated glass tube 10 from the second part 4122 and the end of the third part 4123 is in contact with the inner wall of the elongated glass tube 10, and the third part 4123 forms an obtuse angle with the second part 4122.

The above method further comprises the step of bending the mounting portion 41 to form the opening 43, so as to define the light emission area 11 of the elongated glass tube 10.

In the above method, the wall attaching portion 42 is bent and extended from both ends of the mounting portion 41 to be attached to the inner wall of the heat dissipation area 14 of the elongated glass tube 10. The wall attaching portion 42 has a groove on one side facing the inner wall of the elongated glass tube 10, which is formed by etching a copper sheet, so that the wall attaching portion 42 has a protrusion on the side facing the inner wall of the elongated glass tube 10, and the heat can be conducted by contacting the protrusion and the inner wall of the elongated glass tube 10.

The present invention further provides a method for the light emission of the elongated glass tube light source 100, comprising the steps of:

emitting light from the light emitting unit 20 inside the elongated glass tube 10; and reflecting at least a portion of the light emitted by the light emitting unit 20 to the reflecting layer 31 of the reflecting element 30, and directing the at least a portion of the light towards the light emission area 11 of the elongated glass tube 10, wherein the elongated glass tube 10 is filled with an inert gas or a mixture of inert gas and oxygen.

In the above method, the remaining portion of the light emitted by the light emitting unit 20 is directly projected to the light emission area 11 of the elongated glass tube 10 and emitted.

In the above method, the light emitting unit 20 on the light source mounting part 411 of the mounting portion 41 installed on the substrate 40 emits light, wherein the light emitting unit 20 is positioned facing the reflecting element mounting part 412 of the mounting portion 41 on the substrate 40.

In the above method, it further comprises the steps of: directing the first part light 201 of the light emitted from the light emitting unit 20 to the reflecting layer 31 of the reflecting element 30 of the first part 4121 on the reflecting element mounting part 412 corresponding thereto, and reflecting it towards the light emission area 11 of the elongated glass tube 10; directing the second part light 202 to the reflecting layer 31 of the reflecting element 30 on the second part 4122 of the reflecting element mounting part 412 corresponding thereto, and reflecting it towards the light emission area 11 of the elongated glass tube 10; directing the third part light 203 to the reflecting layer 31 of the reflecting element 30 on the third part 4123 of the reflecting element mounting part 412 corresponding thereto, and reflecting it towards the light emission area 11 of the elongated glass tube 10. The first part 4121 of the reflecting element mounting part 412 forms an acute angle with the light source mounting part 411, the second part 4122 is extended integrally in the direction towards the light emission area 11 of the elongated glass tube 10 from the first part 4121, and form an obtuse angle with the first part 4121, and the third part 4123 is extended integrally in the direction towards the light emission area 11 of the elongated glass tube 10 from the second part 4122, and the end of the third part 4123 is in contact with the inner wall of the elongated glass tube 10, and the third part 4123 also forms an obtuse angle with the second part 4122.

In addition, when the light emitting element 21 of the elongated glass tube light source 100 is a thermoelectric separation lamp bead, it can be directly welded to the heat-conducting substrate 40 without the insulation and heat-resistant layer of the ordinary aluminum substrate. The positive and negative electrodes of the light emitting element 21 of the elongated glass tube light source 100 can also be directly welded to the two conductive and heat-conductive substrates 40 respectively. The back of the two conductive and heat-conductive substrates are connected by a polyimide film, without the insulation and heat-resistant layer of the ordinary aluminum substrate.

It is worth mentioning that the mounting portion 41 of the substrate 40 is formed with one or more thermal convection holes 413, which respectively connect the light source cavity 12 with the heat dissipation cavity 13 to facilitate the heat convection between the light source cavity 12 and the heat dissipation cavity 13.

Figure 4:
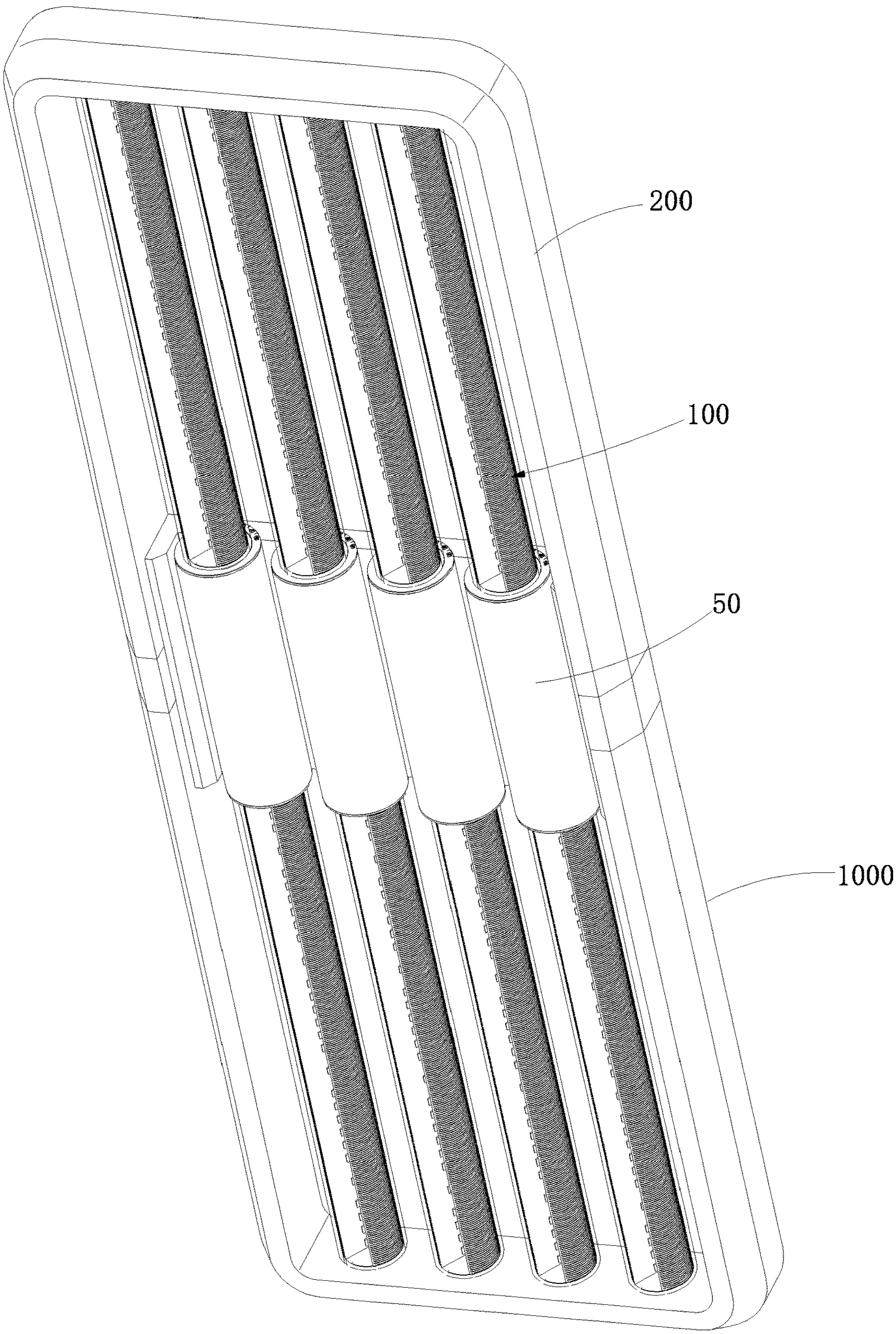
FIG. 4 is a perspective view illustrating the elongated glass tube light source being applied to a lamp according to the above first preferred embodiment of the present invention.
Figure 5:
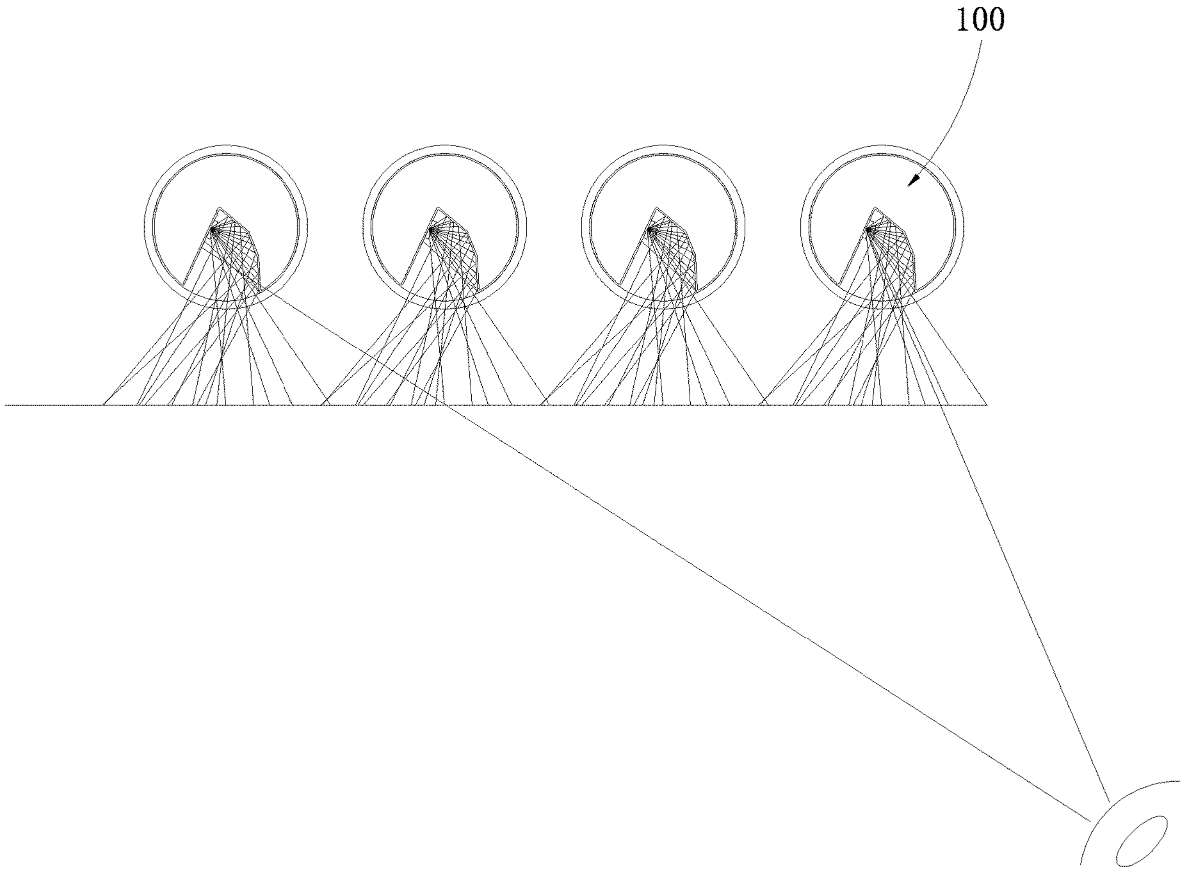
FIG. 5 is a schematic view illustrating the lighting effect of the elongated glass tube light source applied to the lamp according to the above first preferred embodiment of the present invention.

As shown in FIGS. 4 and 5, the lamp 1000 of this embodiment of the present invention comprises a plurality of elongated glass tube light sources 100 and a mounting frame 200. Each elongated glass tube light source 100 is installed on the mounting frame 200 through its mounting head 50, and these elongated glass tube light sources 100 are parallel to each other. The light emission area 11 of the elongated glass tube 10 of each elongated glass tube light source 100 is located on the outer side, so that the light emitted by the corresponding light emitting unit 20 passes through the light emission area 11 of the elongated glass tube 10 and is emitted. The light emission areas 11 of the elongated glass tube 10 of these elongated glass tube light sources 100 can be consistent or appropriately adjusted to provide the lamp 1000 with a suitable illumination area. It is worth mentioning that the brightness distribution of the illumination light emitted by the lamp 1000 incorporated with the elongated glass tube light sources 100 is relatively uniform and has the characteristics of low glare.

In this embodiment, these mounting heads 50 can be located approximately in the center of the mounting frame 200, and two elongated glass tube light sources 100 can be installed on two opposite sides of each mounting head 50.

Figure 6:
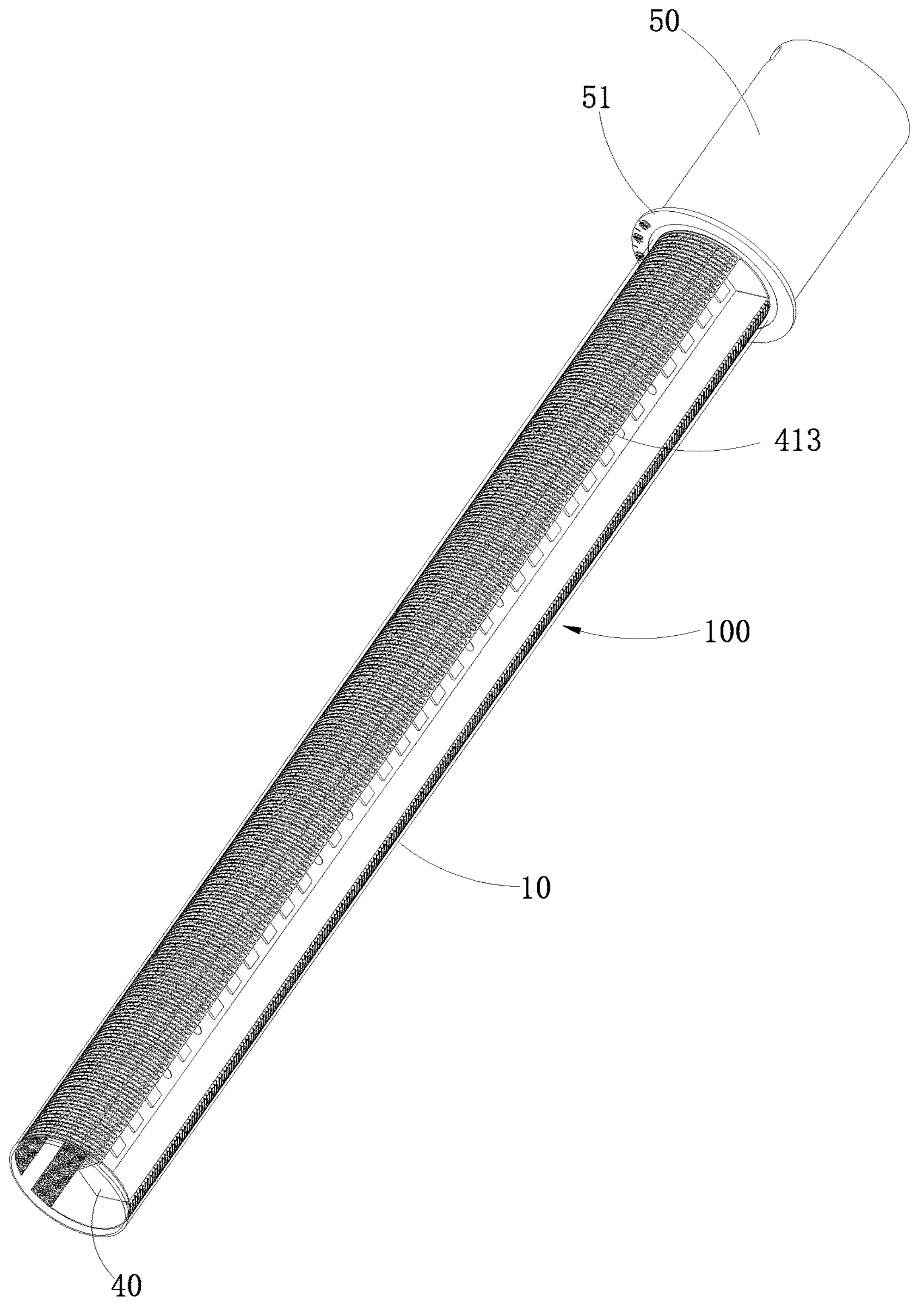
FIG. 6 is a perspective view of an elongated glass tube light source according to a second preferred embodiment of the present invention.
Figure 7:
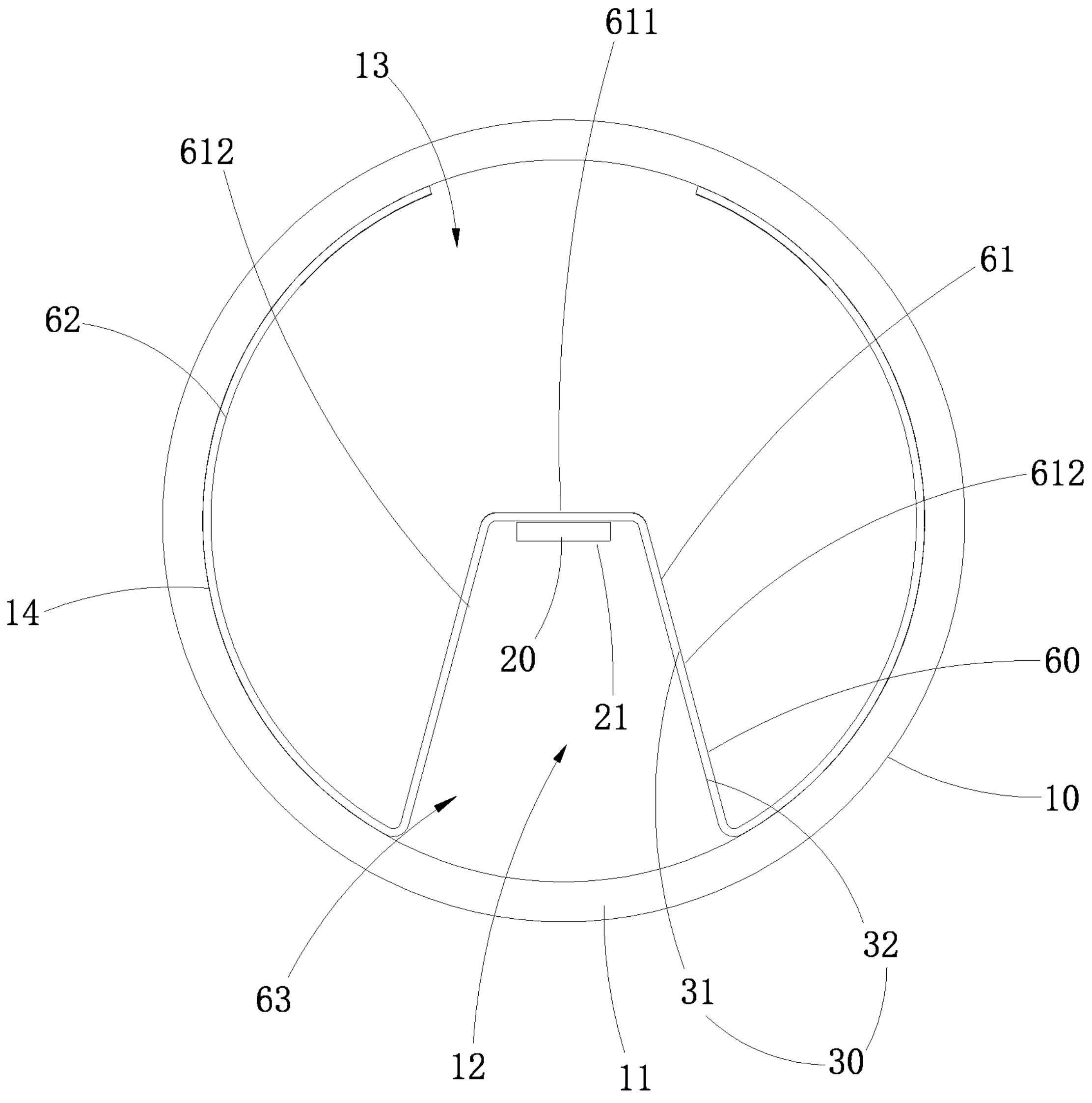
FIG. 7 is a sectional view of the elongated glass tube light source according to the above second preferred embodiment of the present invention.
Figure 8:
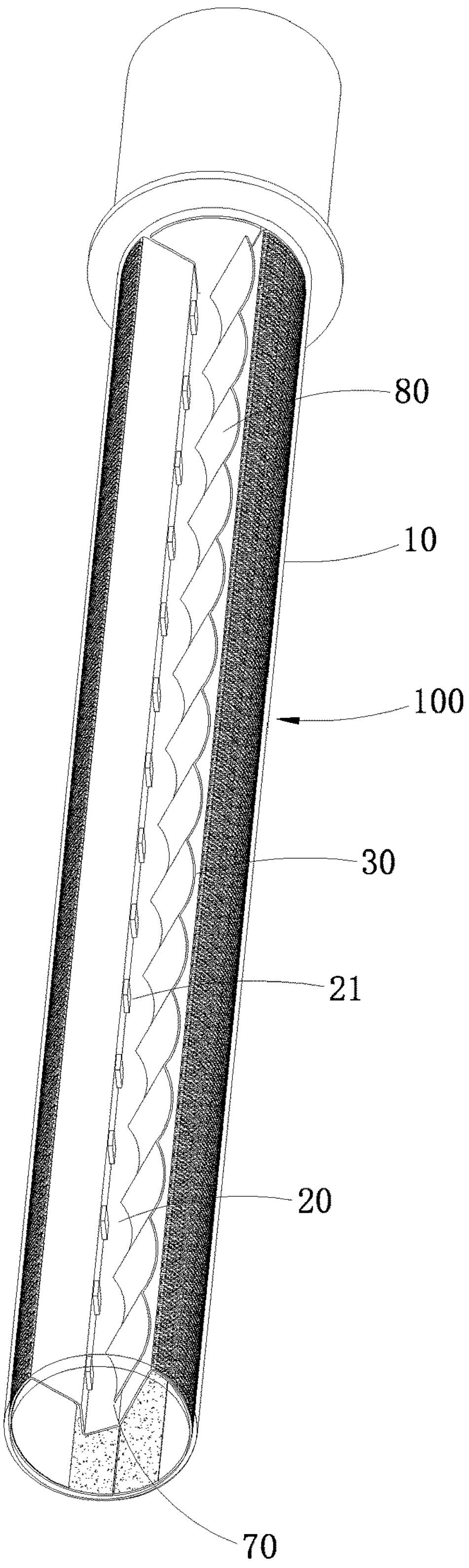
FIG. 8 is a perspective view of an elongated glass tube light source according to a third preferred embodiment of the present invention.
Figure 9:
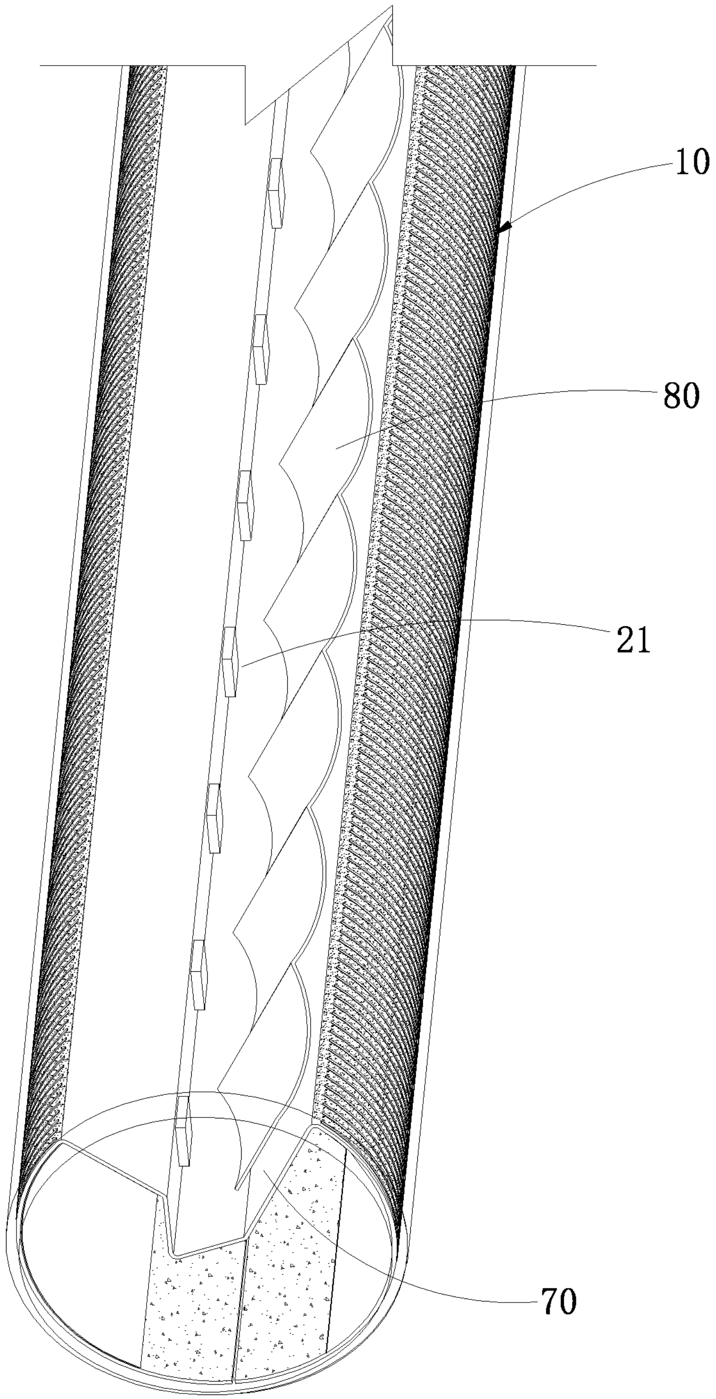
FIG. 9 is a partial enlarged view of the elongated glass tube light source according to the above third preferred embodiment of the present invention, wherein its reflecting element and longitudinal condensing element are illustrated.

As shown in FIGS. 6 to 7, an elongated glass tube light source 100 according to a second preferred embodiment of the present invention is illustrated to comprise an elongated glass tube 10, a light emitting unit 20, a reflecting element 30, a substrate 60, and a mounting head 50. Correspondingly, the elongated glass tube 10 has an light emission area 11, wherein the light emitting unit 20 is located in the elongated glass tube 10 and comprises one or more light emitting elements 21 and other components such as a driving circuit. The reflecting element 30 is also located in the elongated glass tube 10 and is used to reflect the light generated by the light emitting unit 20, thereby projecting the light from the light emission area 11 of the elongated glass tube 10 to the desired area.

It can be understood that the substrate 60 is placed inside the elongated glass tube 10 to form a light source cavity 12 and a heat dissipation cavity 13. The light emitting unit 20 is located in the light source cavity 12. When the light emitting unit 20 is activated to generate light, the light reaching the reflecting element 30 is reflected and emitted from the light emission area 11 of the elongated glass tube 10, so as to project out from the elongated glass tube light source 100. The reflecting element 30 comprises a reflecting layer 31 formed by a silver-plated layer.

The substrate 60 comprises a mounting portion 61 and an wall attaching portion 62 formed by bending. The mounting portion 61 of the substrate 60 is bent to form a light source mounting part 611 and a reflecting element mounting part 612. In this embodiment, the light source mounting part 611 is extended inside the elongated glass tube 10 and is not attached to the inner wall of the elongated glass tube 10 at both ends. The two reflecting element mounting parts 612 are extended obliquely towards the light emission area 11 of the elongated glass tube 10 from both ends of the light source mounting part 611, and each reflecting element mounting part 612 forms an obtuse angle with the light source mounting part 611.

The light emitting unit 20 is mounted on the light source mounting part 611 of the substrate 60, facing the light emission area 11 of the elongated glass tube 10. Part of the emitted light is directly emitted from the light emission area 11 of the elongated glass tube 10, and the other part of the light is reflected by the two reflecting element mounting parts 612 and then directed to the light emission area 11 of the elongated glass tube 10.

Correspondingly, the present invention provides a method for manufacturing the elongated glass tube light source 100, comprising the steps of:

mounting the light emitting unit 20 on the substrate 60 and forming the reflecting element 30 on the substrate 60;

placing the substrate 60 into the elongated glass tube 10; and filling the elongated glass tube 10 with an inert gas or a mixture of inert gas and oxygen gas.

In the above second step, the substrate 60 is bent to form the mounting portion 61 and the wall attaching portion 62, and then the bent substrate 60 is placed into the elongated glass tube 10.

Alternatively, in the first step mentioned above, the substrate 60 is bent to form the mounting portion 61 and the wall attaching portion 62, and then the light emitting unit 20 is mounted on the mounting portion 61 and the reflecting element 30 is formed on the mounting portion 61.

More specifically, the above method further comprises the steps of: bending the mounting portion 61 to form the light source mounting part 611 and the reflecting element mounting part 612, then mounting the light emitting unit 20 on the light source mounting part 611 of the mounting portion 61, and forming the reflecting element 30 on the reflecting element mounting part 612 of the mounting portion 61 by depositing a silver film.

Alternatively, before the mounting portion 61 is bent, the light emitting unit 20 is mounted on the light source mounting part 611 of the mounting portion 61, and the reflecting element 30 is formed on the reflecting element mounting part 612 of the mounting portion 61. Then, the mounting portion 61 is bent to form the bent extension of the light source mounting part 611 and the reflecting element mounting parts 612, wherein the two reflecting element mounting parts 612 are extended inclinedly from the light source mounting part 611, and the light source mounting part 611 is located between the two reflecting element mounting parts 612 in this embodiment.

The above method further comprises the step of bending the mounting portion 61 to form the opening 63 between the ends of the two reflecting element mounting parts 612, so as to define the light emission area 11 of the elongated glass tube 10.

In the above method, the wall attaching portion 62 is bent and extended from both ends of the mounting portion 61 to fit against the inner wall of the heat dissipation area 14 of the elongated glass tube 10, and the wall attaching portion 62 has a groove on one side facing the inner wall of the elongated glass tube 10, the groove is formed by etching a copper sheet, and the wall attaching portion 62 has a protrusion on the side facing the inner wall of the elongated glass tube 10 to have contact with the inner wall of the elongated glass tube 10 to conduct heat.

The present invention further provides a method for emitting light from the elongated glass tube light source 100, comprising the steps of:

emitting light by the light emitting unit 20 in the elongated glass tube 10; and reflecting at least a portion of the light emitted by the light emitting unit 20 which is reached to the coated reflecting layer 31 of the reflecting element 30 towards the light emission area 11 of the elongated glass tube 10, while the remaining portion of the light emitted by the light emitting unit 20 is directly projected towards the light emission area 11 of the elongated glass tube 10, wherein the elongated glass tube 10 is filled with an inert gas or a mixture of an inert gas and oxygen.

In the above method, the step of emitting light by the light emitting unit 20 is performed by the light source mounting part 611 of the mounting portion 61 mounted on the substrate 60, wherein the light emitting unit 20 is oriented towards the light emission area 11 of the elongated glass tube 10.

In the above method, the step of reflecting at least a portion of the light emitted by the light emitting unit 20 towards the light emission area 11 of the elongated glass tube 10 is performed by the reflecting layer 31 of the reflecting element 30 which is provided on the two inclined and extended reflecting element mounting parts 612.

Figure 10:
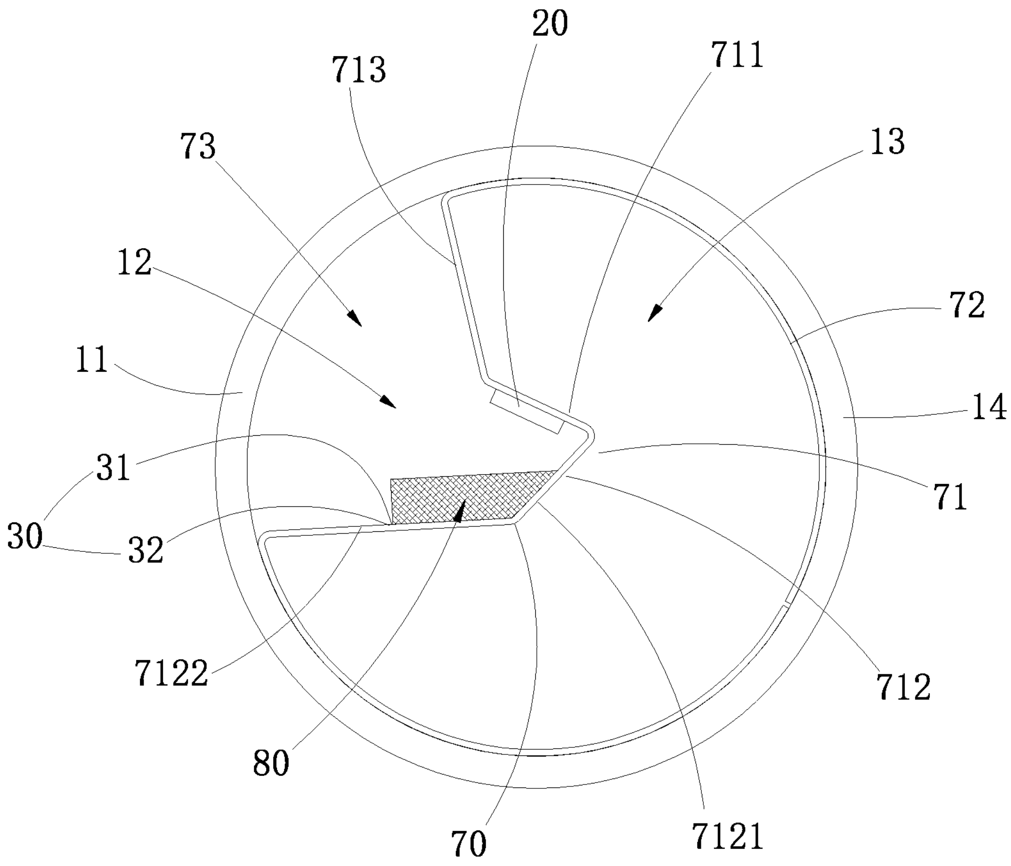
FIG. 10 is an enlarged sectional view of the elongated glass tube light source according to the above third preferred embodiment of the present invention.
Figure 11:
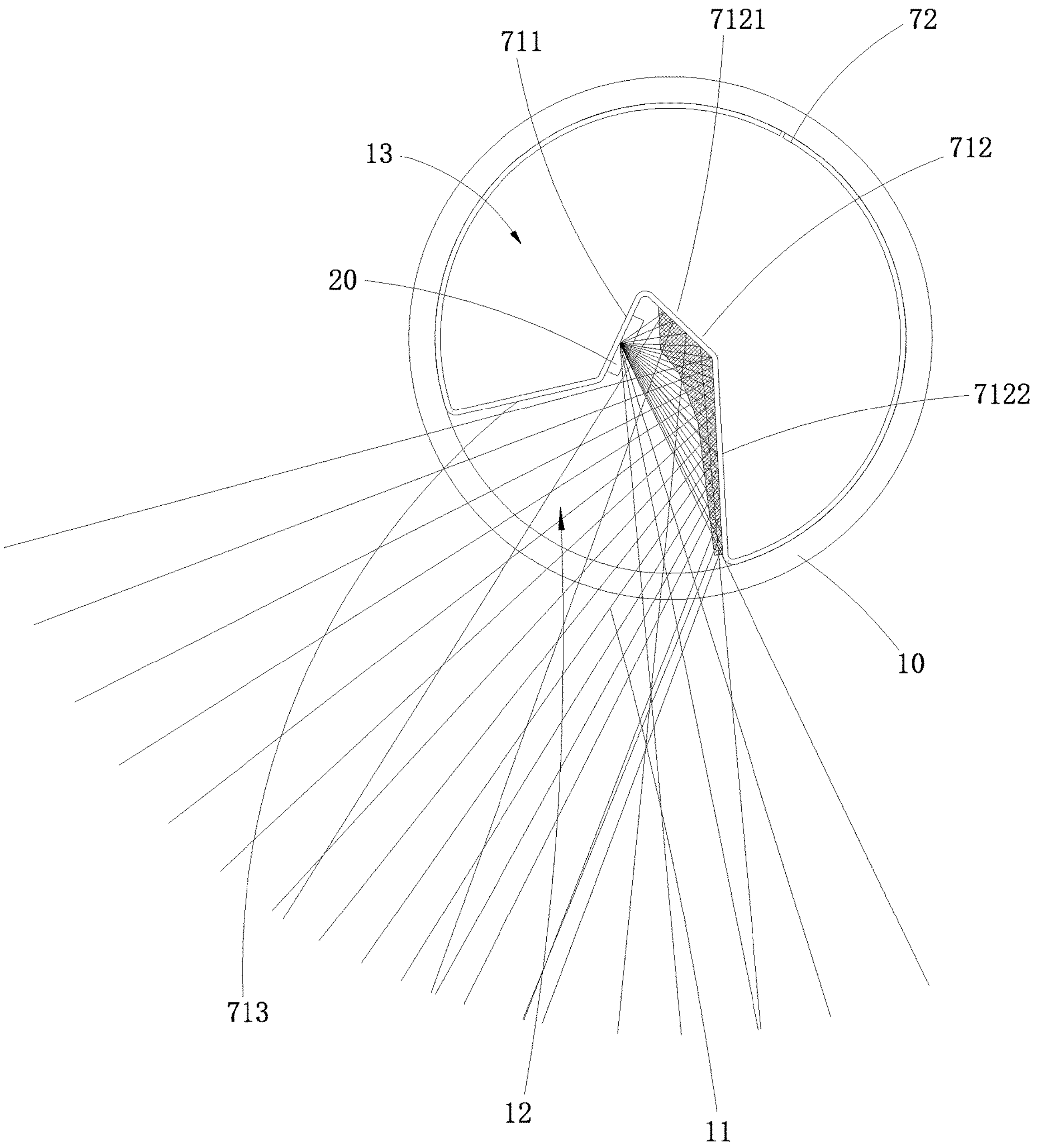
FIG. 11 is an enlarged sectional view showing the light emitting state of the elongated glass tube light source according to the above third preferred embodiment of the present invention.
Figure 12:
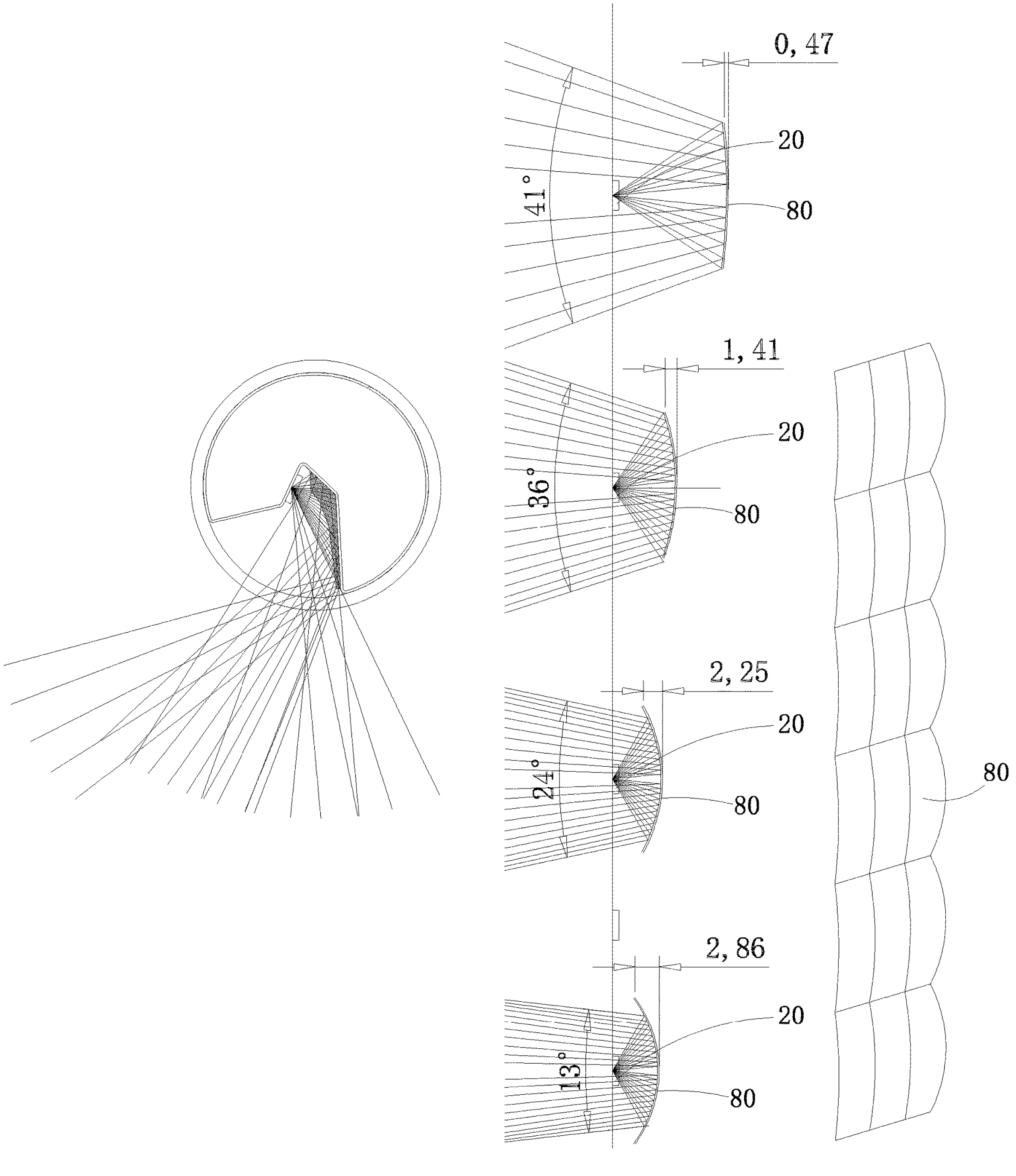
FIG. 12 is a schematic view of the longitudinal condensing element of the elongated glass tube light source according to the above third preferred embodiment of the present invention.

As shown in FIGS. 10 to 12, an elongated glass tube light source 100 according to a third preferred embodiment of the present invention is illustrated to comprise an elongated glass tube 10, a light emitting unit 20, a reflecting element 30, a substrate 70, a condensing element 80, and a mounting head 50. Correspondingly, the elongated glass tube 10 has an light emission area 11, wherein the light emitting unit 20 is located in the elongated glass tube 10 and comprises one or more light emitting elements 21 and other components such as a driving circuit. The reflecting element 30 and the condensing element 80 are also located in the elongated glass tube 10. The reflecting element 30 is used to reflect the light generated by the light emitting unit 20, and the condensing element 80 is used to converge the light generated by the light emitting unit 20, thereby projecting the light from the light emission area 11 of the elongated glass tube 10 to the desired area.

In this embodiment, the condensing element 80 can be implemented as a longitudinal condensing lens which is wave-shaped and used to converge the light emitted by the light emitting unit 20, so as to further utilize the light emitted by the light emitting unit 20 reasonably and prevent the generation of glare light.

It can be understood that in this embodiment, the substrate 70 is placed inside the elongated glass tube 10 to form the light source cavity 12 and the heat dissipation cavity 13, wherein the light emitting unit 20 is located in the light source cavity 12. When the light emitting unit 20 is turned on to generate light, the light reaching the reflecting element 30 is reflected and emitted from the light emission area 11 of the elongated glass tube 10, so as to project out from the elongated glass tube light source 100. The reflecting element 30 comprises a reflecting layer 31 which is formed by a silver coating.

The substrate 70 comprises a mounting portion 71 and an wall attaching portion 72 formed by bending. The mounting portion 71 of the substrate 70 is bent to form a light source mounting part 711, a reflecting element mounting part 712, and an extension part 713. In this embodiment, the light source mounting part 711 is extended inside the elongated glass tube 10 and is not attached to the inner wall of the elongated glass tube 10 at both ends. The reflecting element mounting part 712 and the extension part 713 are extended obliquely towards the light emission area 11 of the elongated glass tube 10 from both ends of the light source mounting part 711, and the two ends of the reflecting element mounting part 712 and the extension part 713 form the opening 73.

The light emitting unit 20 is mounted facing the reflecting element mounting part 712 on the substrate 70 at the light source mounting part 711, and the light emitted is reflected by the reflecting element mounting part 712 and directed towards the light emission area 11 of the elongated glass tube 10.

In this embodiment, the condensing element 80 is mounted on the reflecting element mounting part 712, and the reflecting element 30 is formed on the reflecting element mounting part 712. The reflecting element mounting part 712 is further bent to form multiple sections, such as sections 7121 and 7122, and the condensing element 80 is positioned in the transitional area between the two sections 7121 and 7122.

FIG. 11 is a cross-sectional enlarged schematic view illustrating the emission state of the elongated glass tube light source 100 according to the third preferred embodiment of the present invention. A part of the light emitted by the light emitting unit 20 is directly emitted from the light emission area 11 of the elongated glass tube 10, a part of the light reaches the reflecting element 30 on the reflecting element mounting part 712 is reflected towards the light emission area 11 of the elongated glass tube 10, and another part of the light is reflected by the reflecting element 30 on the reflecting element mounting part 712 and converges by the condensing element 80 before being emitted towards the light emission area 11 of the elongated glass tube 10.

As shown in FIG. 12, when the surface curvature of the condensing element 80 is different, the diffusion angle of the converged light can be adjusted, thereby facilitating the design of the condensing element 80 to achieve efficient lighting and prevent dazzle light.

Correspondingly, the present invention provides a method for manufacturing the elongated glass tube light source 100, comprising the following steps:

- installing the light emitting unit 20 on the substrate 70 and forming the reflecting element 30 on the substrate 70, and mounting the condensing element 80 on the substrate 70;
- placing the substrate 70 into the elongated glass tube 10; and
- filling the elongated glass tube 10 with an inert gas or a mixture of an inert gas and oxygen gas.

In the second step mentioned above, the substrate 70 is bent to form the mounting portion 71 and the wall attaching portion 72, and then the bent substrate 70 is placed into the elongated glass tube 10.

Alternatively, in the first step mentioned above, the substrate 70 is bent to form the mounting portion 71 and the wall attaching portion 72. Then, the light emitting unit 20 is mounted on the mounting portion 71, the reflecting element 30 is formed on the mounting portion 71, and the condensing element 80 is mounted on the mounting portion 71.

More specifically, the above method further comprises the steps of: bending the mounting portion 71 to form the light source mounting part 711, the reflecting element mounting part 712, and the extension part 713, and then mounting the light emitting unit 20 on the light source mounting part 711 of the mounting portion 71, and forming the reflecting element 30 on the reflecting element mounting part 712 of the mounting portion 71 by silver plating.

Alternatively, before bending the mounting portion 71, the light emitting unit 20 is mounted on the light source mounting part 711 of the mounting portion 71, the reflecting element 30 is formed on the reflecting element mounting part 712 of the mounting portion 71, the condensing element 80 is mounted on the reflecting element mounting part 712, and then the mounting portion 71 is bent to form the bent and extended light source mounting part 711, reflecting element mounting part 712, and extension part 713, wherein the reflecting element mounting part 712 and the extension part 713 are extended inclinedly from the light source mounting part 711, and the light source mounting part 711 is located between the two reflecting element mounting parts 712 and extension part 713, and the extension part 713 does not need to form the reflecting element 30.

The above method further comprises the step of bending the mounting portion 71 to form an opening 73 between the ends of the reflecting element mounting part 712 and the extension part 713, so as to define the light emission area 11 of the elongated glass tube 10.

In the above method, the wall attaching portion 72 is bent and extended from both ends of the mounting portion 71 to be attached to the inner wall of the heat dissipation area 14 of the elongated glass tube 10. The wall attaching portion 72 has a groove on one side facing the inner wall of the elongated glass tube 10, and the groove is formed by etching a copper sheet. The wall attaching portion 72 has a protrusion on the side facing the inner wall of the elongated glass tube 10, and the protrusion contacts the inner wall of the elongated glass tube 10 to conduct heat.

The present invention further provides a method for emitting light from the elongated glass tube light source 100, comprising the steps of:

- emitting light by the light emitting unit 20 inside the elongated glass tube 10; and
- directing a portion of the light emitted by the light emitting unit 20 towards the light emission area 11 of the elongated glass tube 10, reflecting a portion of the light emitted by the light emitting unit 20 reaching the reflecting layer 31 of the reflecting element 30 towards the light emission area 11 of the elongated glass tube 10; and reflecting a portion of the light emitted by the light emitting unit 20 reaching the reflecting layer 31 of the reflecting element 30 and converging the portion of the light through the condensing element 80 before being directed towards the light emission area 11 of the elongated glass tube 10. The elongated glass tube 10 is filled with an inert gas or a mixture of an inert gas and oxygen.

In the above method, the light emitting unit 20 of the light source mounting part 711 for providing illumination is mounted on the mounting portion 71 installed on the substrate 70. The light emitting unit 20 is oriented towards the reflecting element mounting part 712 of the mounting portion 71 on the substrate 70.

Figure 13:
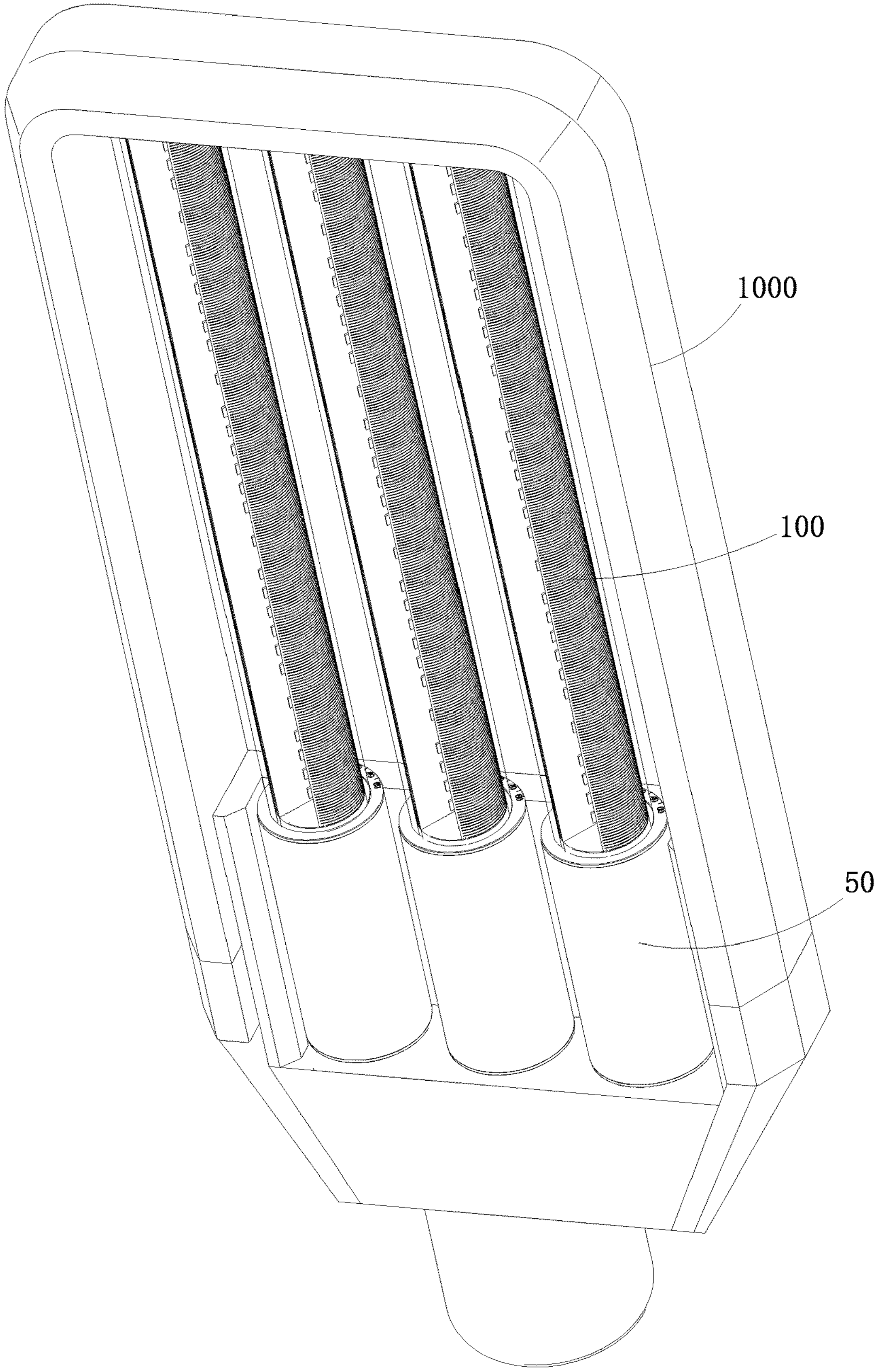
FIG. 13 is a perspective view of the application of the elongated glass tube light source in a lamp according to the above-mentioned third preferred embodiment of the present invention.

FIG. 13 is a perspective view illustrating the elongated glass tube light source 100 according to the third preferred embodiment of the present invention being applied to the lamp 1000. The lamp 1000 comprises a plurality of elongated glass tube light sources 100 and a mounting frame 200, wherein each elongated glass tube light source 100 is installed on the mounting frame 200 by its mounting head 50, and these elongated glass tube light sources 100 are parallelly arranged with each other. The light emission area 11 of the elongated glass tube 10 of each elongated glass tube light source 100 is located on the outer side, so that the light emitted by the corresponding light emitting unit 20 passes through the light emission area 11 of the elongated glass tube 10 and is emitted. In this embodiment, each mounting head 50 is located at the end of the elongated glass tube light source 100 and abuts against the inner surface of the mounting frame 200.

Figure 14:
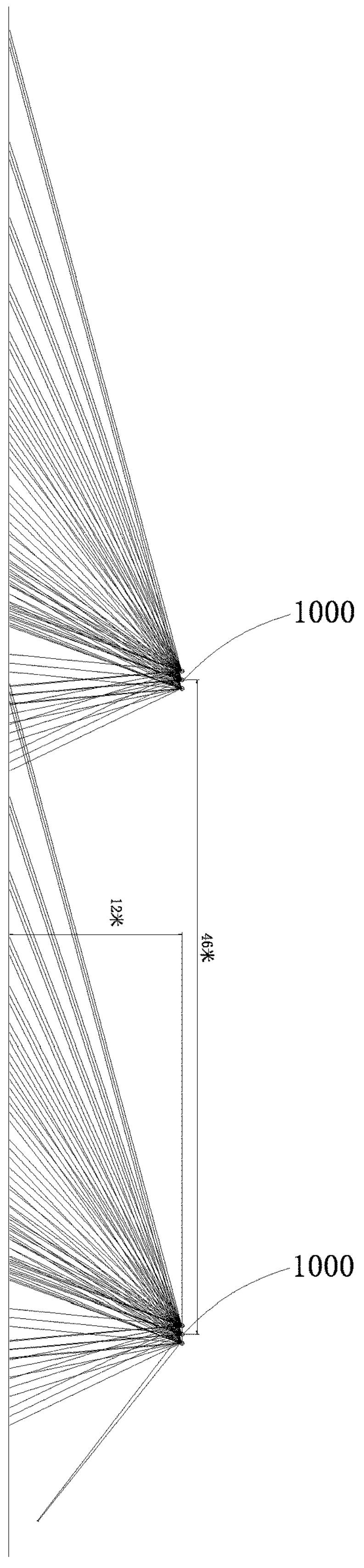
FIG. 14 is a schematic view of the lighting effect of the lamp with the elongated glass tube light source in the lamp according to the above-mentioned third preferred embodiment of the present invention.

As shown in FIG. 14, when a plurality of lamps 1000 of the present invention are arranged at suitable intervals and the angles and positions of the light emission areas 11 of the elongated glass tube 10 of each elongated glass tube light source 100 are adjusted, the lamps 1000 have a suitable illumination area, and the brightness distribution of the illumination light emitted by the lamps 1000 incorporated with the elongated glass tube light sources 100 is relatively uniform and has the characteristics of low glare.

Figure 15:
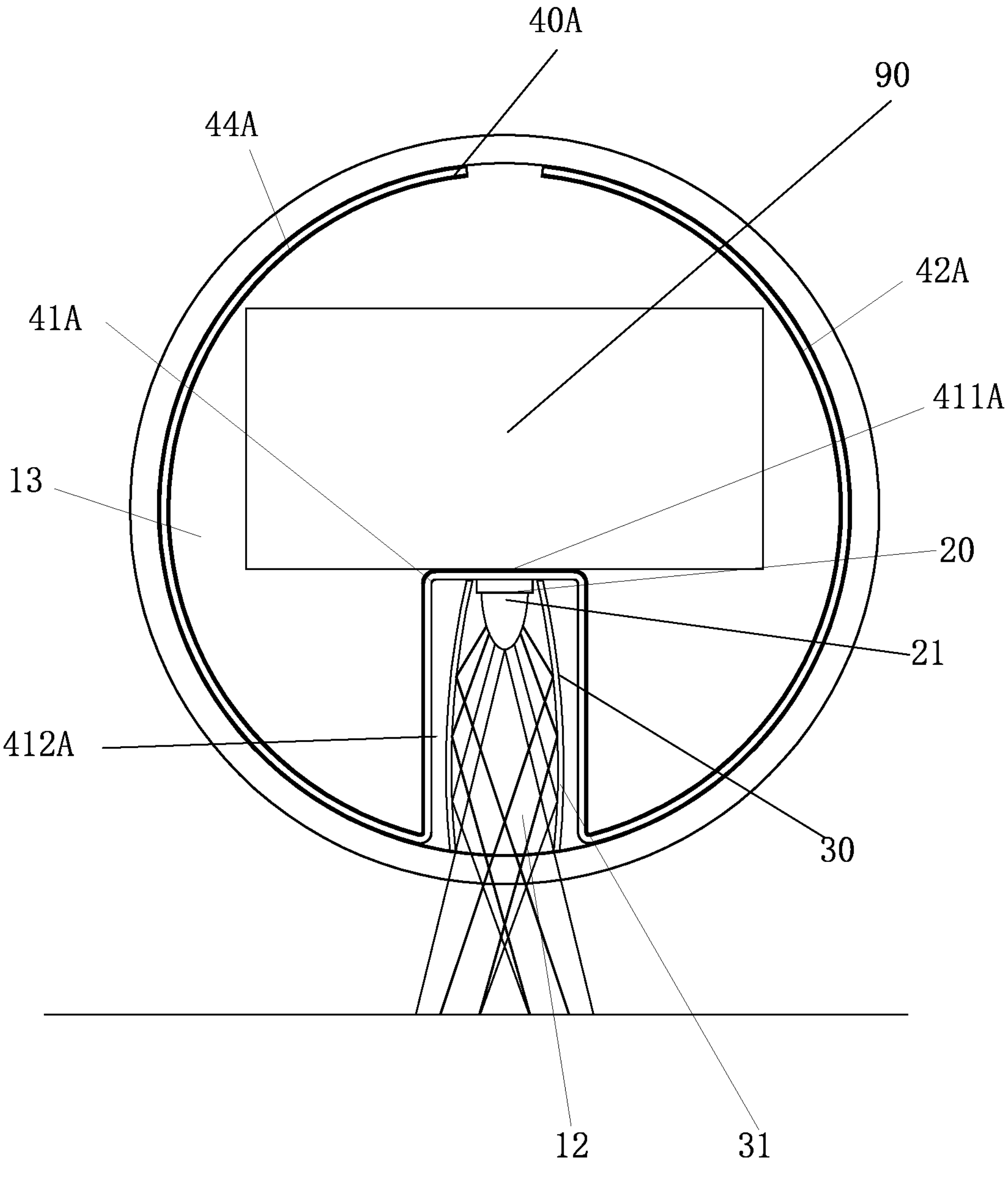
FIG. 15 is a sectional view of an elongated glass tube light source according to a fourth preferred embodiment of the present invention.

Referring to FIG. 15 of the drawings, an elongated glass tube light source 100 according to a fourth preferred embodiment of the present invention are illustrated. The elongated glass tube light source 100 comprises an elongated glass tube 10, a light emitting unit 20, a reflecting element 30, and a substrate 40A. The light emitting unit 20 is located in the elongated glass tube 10 and comprises one or more light emitting elements 21 and other components such as a driving circuit. The reflecting element 30, which is also located in the elongated glass tube 10, is used to reflect the light generated by the light emitting unit 20, so as to project the light from the light emission area of the elongated glass tube 10 to the desired area. In this embodiment, the light emitting unit 20 preferably comprises a plurality of light emitting elements 21 arranged in a row or multiple rows along the length direction of the elongated glass tube 10. The substrate 40A is bent and placed inside the elongated glass tube 10, and the internal space of the elongated glass tube 10 forms two cavities, namely a light source cavity 12 and a heat dissipation cavity 13. The reflecting element 30 comprises a reflecting layer 31 which is formed by a silver-plated layer and is formed on the side surface of the substrate 40A facing the light source cavity 12, and the light emitting unit 20 is placed in the light source cavity 12. Both the light source cavity 12 and the heat dissipation cavity 13 are filled with helium or a mixture of helium and oxygen to prevent sulfurization of the reflecting layer 31 of the reflecting element 30.

In this embodiment, the elongated glass tube light source 100 further comprises a high voltage non-isolated power module 90 which is attached to the substrate 40A in the heat dissipation cavity 13 for supplying electricity power to the light emitting unit 20. It is worth mentioning that the cost of the high voltage non-isolated power module 90, which is about one third of the cost of the isolated power module 90, is significantly smaller than the cost of an isolated power module 90. The high voltage non-isolated power module 90 which is of 180-460V has a higher electrical insulation requirement. However, the high voltage non-isolated power module 90 of the present invention is disposed into the heat dissipation cavity 13 within the elongated glass tube 10, so that the electrical insulation requirement for the high voltage non-isolated power module 90 is easy to be satisfied, so as to ensure the safe use of the high voltage non-isolated power module 90.

In other words, compared with employing a high voltage isolated power module which is installed at an outer side of the elongated glass tube 10, disposing and installing the high voltage non-isolated power module 90 in the elongated glass tube 10 is able to achieve the advantages of reducing cost and solving the problem of providing an electrical insulation environment for the high voltage non-isolated power module 90.

Accordingly, helium or a mixture of helium and oxygen filled in the light source cavity 12 and the heat dissipation cavity 13 is able to transfer the heat in the high voltage non-isolated power module 90 to the substrate 40A, and thus the heat can be further dissipated to the outer side through the elongated glass tube 10.

Similar to the above embodiments, the substrate 40A is bent to form a mounting portion 41A and at least a wall attaching portion 42A which is attached on an inner wall of the elongated glass tube 10. The mounting portion 41A is configured in U-shape and may comprise a light source mounting part 411A for mounting the light emitting unit 20 and a reflecting element mounting part 412A for forming the reflecting element 30 thereon. In this embodiment, the mounting portion 41A comprises two reflecting element mounting parts 412A spacedly and parallelly extended from the light source mounting part 411A.

The substrate 40A in this embodiment may not be a thermoelectric separation substrate for heat dissipation. In other words, the substrate 40A may be electrically conducted to the light emitting unit 20. Under this condition, the substrate 40A can be provided with an electrical insulation layer 44A facing towards the high voltage non-isolated power module 90.

In addition, the inner wall of the elongated glass tube 10 may be further provided with an antireflection coating layer to increase the light permeability of the elongated glass tube 10, as well as to prevent the damage and breakage of the elongated glass tube 10.

Figure 16:
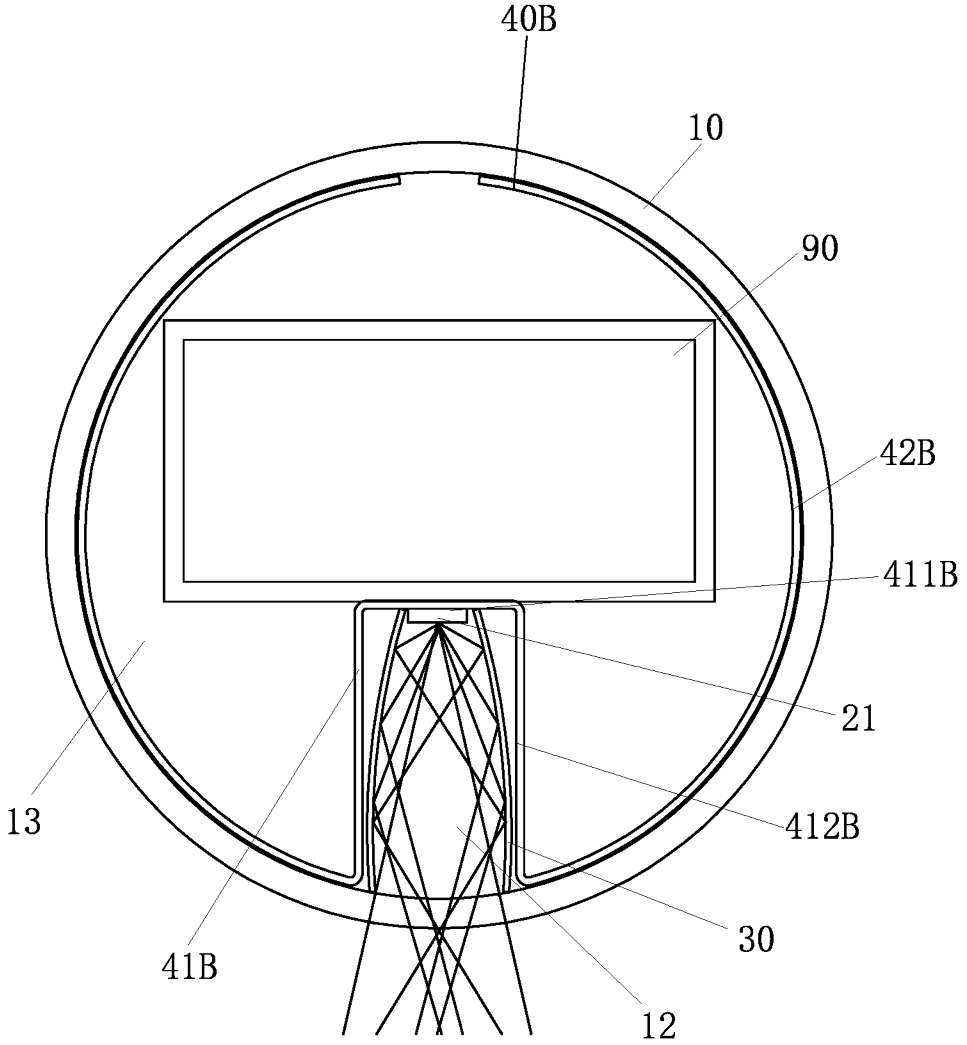
FIG. 16 is a sectional view of an elongated glass tube light source according to a fifth preferred embodiment of the present invention.

As shown in FIG. 16 of the drawings, according to a fifth preferred embodiment of the present invention, the elongated glass tube light source 100 comprises an elongated glass tube 10, a light emitting unit 20, a reflecting element 30, and a substrate 40B. The substrate 40B is bent to form a mounting portion 41B and at least a wall attaching portion 42B which is attached on an inner wall of the elongated glass tube 10. The substrate 40B in this embodiment can be embodied as a thermoelectric separation substrate for heat dissipation. In other words, the substrate 40B is not electrically conducted to the light emitting unit 20, and only functions to dissipate heat. Under this condition, the substrate 40B is not required to be formed with the insulation layer facing towards the high voltage non-isolated power module 90.

Figure 17:
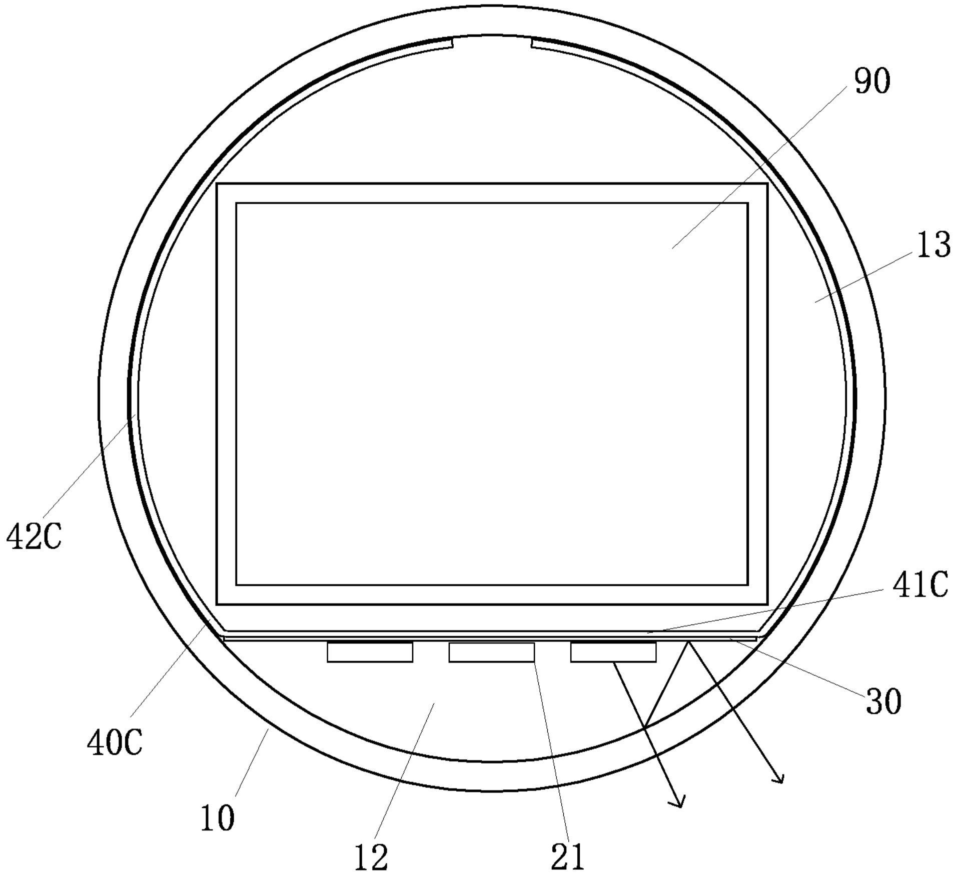
FIG. 17 is a sectional view of an elongated glass tube light source according to a sixth preferred embodiment of the present invention.

Referring to FIG. 17 of the drawings, an elongated glass tube light source 100 according to a sixth preferred embodiment of the present invention are illustrated. The elongated glass tube light source 100 comprises an elongated glass tube 10, a light emitting unit 20, a reflecting element 30, and a substrate 40C. The elongated glass tube 10 has a light emission area, and the light emitting unit 20 is located in the elongated glass tube 10 and comprises one or more light emitting elements 21 and other components such as a driving circuit. The reflecting element 30, which is also located in the elongated glass tube 10, is used to reflect the light generated by the light emitting unit 20, so as to project the light from the light emission area of the elongated glass tube 10 to the desired area. In this embodiment, the light emitting unit 20 preferably comprises a plurality of light emitting elements 21 arranged in a row or multiple rows along the length direction of the elongated glass tube 10. The substrate 40C is bent and placed inside the elongated glass tube 10, and the internal space of the elongated glass tube 10 forms two cavities, namely a light source cavity 12 and a heat dissipation cavity 13.

More specifically, the substrate 40C is bent to form a mounting portion 41C and at least a wall attaching portion 42C which is attached on an inner wall of the elongated glass tube 10. The reflecting element 30 comprises a reflecting layer which is formed by a silver-plated layer and is formed on mounting portion 41C facing the light source cavity 12. Similarly, the light source cavity 12 and the heat dissipation cavity 13 are filled with helium or a mixture of helium and oxygen to prevent sulfurization of the reflecting layer 31 of the reflecting element 30.

In this embodiment, similar to the above fourth and fifth embodiment, the elongated glass tube light source 100 further comprises a high voltage non-isolated power module 90 which is attached to the substrate 40A in the heat dissipation cavity 13.

Figure 18:
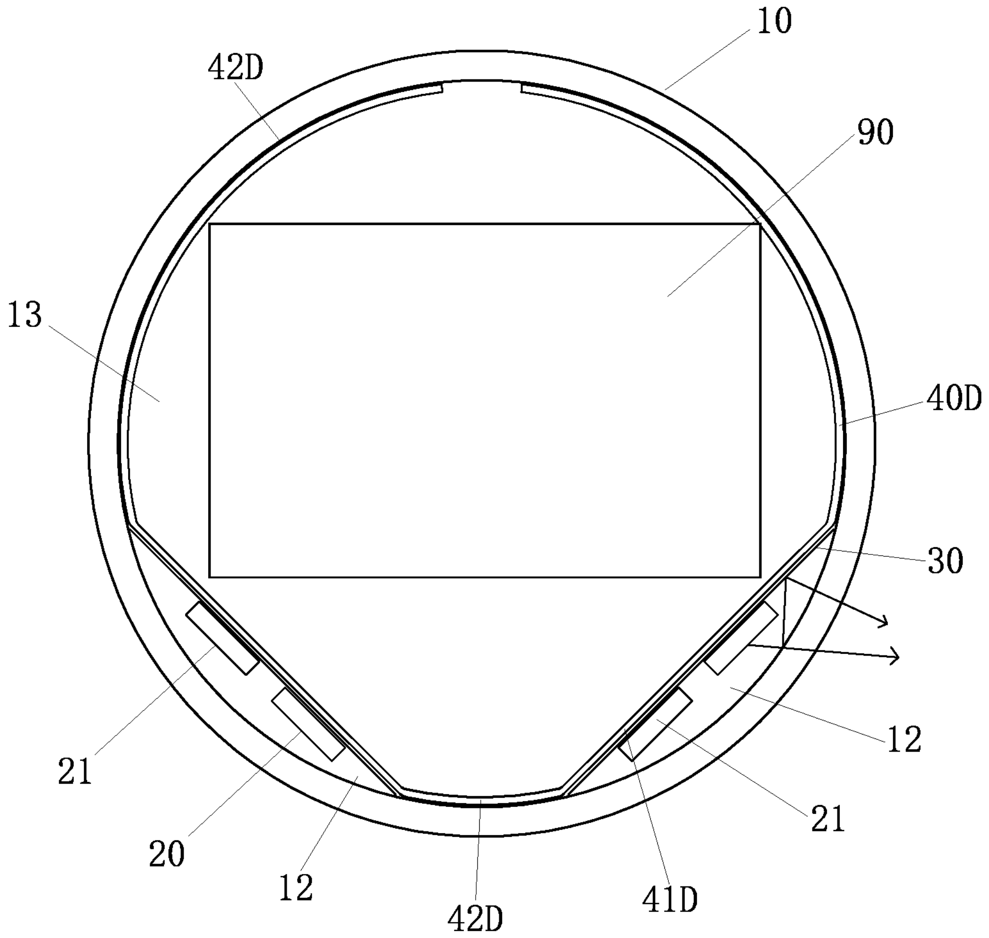
FIG. 18 is a sectional view of an elongated glass tube light source according to a seventh preferred embodiment of the present invention

As shown in FIG. 18 of the drawings, according to a seventh preferred embodiment of the present invention, the elongated glass tube light source 100 comprises an elongated glass tube 10, two light emitting units 20, a reflecting element 30, a substrate 40D, and a high voltage non-isolated power module 90 which is attached to the substrate 40D in the elongated glass tube 10. The substrate 40D is bent to form two mounting portions 41D and three wall attaching portions 42D which are attached on an inner wall of the elongated glass tube 10. The substrate 40D in this embodiment is disposed within the elongated glass tube 10 and the internal space of the elongated glass tube 10 forms two light source cavities 12 and a heat dissipation cavity 13. Each of the two mounting portions 41D is mounted with a light emitting unit 20, so that the elongated glass tube light source 100 provides illumination from two illumination sides.

It is worth mentioning that the high voltage non-isolated power module 90 also can be applied to the above first, second and third embodiments of the present invention.

Figure 19:
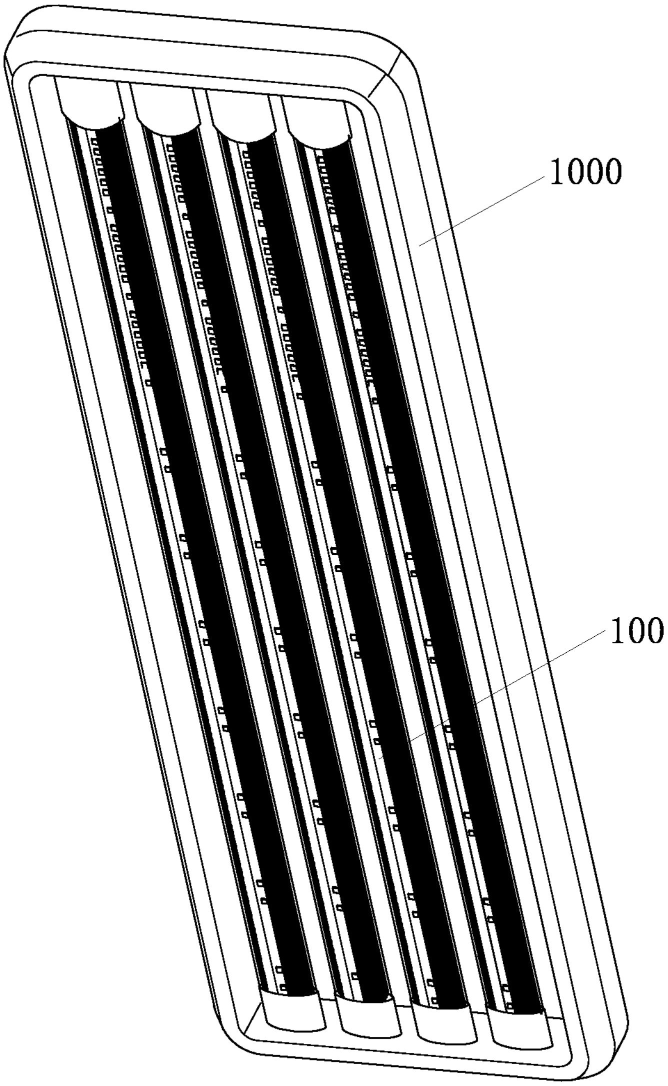
FIG. 19 is a perspective view illustrating the elongated glass tube light source being applied to a lamp according to above fourth to seventh preferred embodiment of the present invention.

Referring to FIG. 19 of the drawings, a plurality of the elongated glass tube light source 100 according to the above fourth to seventh embodiment of the present invention can be incorporated into a lamp 1000 which can be a projector lamp or a plant grow lamp One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention comprises all modifications encompassed within the spirit and scope of the following claims.

What is claimed is:

1. An elongated tube glass light source, comprising: an elongated glass tube, wherein the elongated glass tube has an light emission area; a light emitting unit; a reflecting element, wherein the light emitting unit and the reflecting element are located within the elongated glass tube, and the reflecting element comprises a reflecting layer, wherein light emitted from the light emitting unit and reaching the reflecting layer of the reflecting element is reflected and emitted from the light emission area of the elongated glass tube; and a substrate which is bent and placed in the elongated glass tube to form a light source cavity and a heat dissipation cavity, wherein the light source cavity is enclosed within a substantially V-shaped region, wherein the light source cavity and the heat dissipation cavity are filled with an inert gas or a mixture of an inert gas and oxygen, wherein the light emitting unit and the reflecting element are located in the light source cavity, and the reflecting element comprises a mirror base and the reflecting layer is a silver-plated layer which is formed on the mirror base, and then the mirror base is thermally pressed on the substrate to form an integral structure which is bent along with the substrate to define the light source cavity for allowing the reflecting element to reflect the light from the light emitting unit, wherein the inert gas or the mixture of the inert gas and oxygen filled in the light source cavity and the heat dissipation cavity is able to prevent the silver-plated layer from sulfidation and blackening, wherein the substrate is bent to form a mounting portion and a wall attaching portion connected to the mounting portion, wherein the mounting portion of the substrate is formed with one or more thermal convection holes, which respectively communicate the light source cavity with the heat dissipation cavity to facilitate the heat convection between the light source cavity and the heat dissipation cavity.

2. The elongated tube glass light source according to claim 1, wherein the substrate has thermal conductivity, wherein the mounting portion forms the light source cavity between the mounting portion and the light emission area of the elongated glass tube, and the wall attaching portion forms the heat dissipation cavity between the mounting portion and the wall attaching portion, wherein the light emitting unit and the light emitting element are installed on the mounting portion, and the wall attaching portion is attached to an inner wall of the heat dissipation area of the elongated glass tube to conduct heat, wherein the wall attaching portion facing an inner wall of the elongated glass tube is etched, a thickness of the wall attaching portion is 0.2-0.5 mm, and a groove depth formed by etching a copper sheet of the substrate is 0.03-0.1 mm.

3. The elongated tube glass light source according to claim 1, wherein the light emitting unit comprises a plurality of light emitting elements arranged along the length direction of the elongated glass tube, and the light emitting elements are fluorescent lamps, LEDs, or OLEDs.

4. The elongated tube glass light source according to claim 1, wherein the inert gas is helium.

5. The elongated tube glass light source according to claim 1, further comprising a high voltage non-isolated power module provided within the elongated tube glass for supplying electricity power to the light emitting unit, wherein the high voltage non-isolated power module, which is of 180-460V, is attached to the substrate and disposed in the heat dissipation cavity, wherein the inert gas filled in the light source cavity and the heat dissipation cavity is able to transfer heat in the high voltage non-isolated power module to the substrate, and thus the heat is further dissipated to an outer side through the elongated glass tube.

6. The elongated tube glass light source according to claim 2, wherein the mounting portion forms a light source mounting part and a reflecting element mounting part after being bent, wherein the light emitting unit is installed on the light source mounting part and faces the reflecting element mounting part, and the reflecting element is formed on the reflecting element mounting part.

7. The elongated tube glass light source according to claim 2, wherein the mounting portion is bent to form the light source mounting part and two reflecting element mounting parts, wherein the light emitting unit is mounted on the light source mounting part and faces towards the light emission area of the elongated glass tube, and the reflecting element is formed on the two reflecting element mounting parts, wherein the two reflecting element mounting parts are extended obliquely towards the light emission area of the elongated glass tube from both ends of the light source mounting part, and each reflecting element mounting part forms an obtuse angle with the light source mounting part, wherein ends of the two reflecting element mounting parts form an opening to define the light emission area of the elongated glass tube.

8. The elongated tube glass light source according to claim 2, wherein the mounting portion is bent to form a light source mounting part, a reflecting element mounting part, and an extension part, wherein the light emitting unit is installed on the light source mounting part and faces the reflecting element mounting part, wherein the reflecting element is formed on the reflecting element mounting part, and the reflecting element mounting part and the extension part are extended from two ends of the light source mounting part after being bent, and ends of the reflecting element mounting part and the extension part form an opening to define the light emission area of the elongated glass tube.

9. The elongated tube glass light source according to claim 6, wherein the reflective part comprises a first part, a second part, and a third part, wherein the first part of the reflecting element mounting part forms an acute angle with the light source mounting part, the second part is extended integrally towards the light emission area of the elongated glass tube from the first part and forms an obtuse angle with the first part, the third part is extended integrally towards the light emission area of the elongated glass tube from the second part and is attached to the inner wall of the elongated glass tube at an end of the third part, the third part also forms an obtuse angle with the second part, and ends of the third part and the light source mounting part form an opening to define the light emission area of the elongated glass tube.

10. The elongated tube glass light source according to claim 8, wherein the elongated glass tube light source further comprises a condensing element installed on the reflecting element mounting part within the light source cavity to converge the light generated by the light emitting unit by allowing the light generated by the light emitting unit to pass through the condensing element and to be reflected by the reflecting element, and then pass through the condensing element to reach the light emission area.

11. The elongated tube glass light source according to claim 10, wherein the condensing element is a wave-shaped longitudinal condensing lens, and the reflecting element mounting part is divided into two parts after being bent, with the condensing element is provided in a transition area between the two parts.

12. The elongated tube glass light source according to claim 5, wherein the substrate is a thermoelectric separation substrate, wherein the high voltage non-isolated power module is mounted to the substrate.

13. The elongated tube glass light source according to claim 5, wherein the substrate comprises an electrical insulation layer at an side facing towards the high voltage non-isolated power module.

14. A lamp, comprising a mounting frame and at least one elongated glass tube light source installed on the mounting frame, wherein each of the at least one elongated tube glass light source comprises: an elongated glass tube, wherein the elongated glass tube has an light emission area; a light emitting unit; a reflecting element, wherein the light emitting unit and the reflecting element are located within the elongated glass tube, and the reflecting element comprises a reflecting layer, wherein light emitted from the light emitting unit and reaching the reflecting layer of the reflecting element is reflected and emitted from the light emission area of the elongated glass tube; and a substrate which is bent and placed in the elongated glass tube to form a light source cavity and a heat dissipation cavity, wherein the light source cavity is enclosed within a substantially V-shaped region, wherein the light source cavity and the heat dissipation cavity are filled with an inert gas or a mixture of an inert gas and oxygen, wherein the light emitting unit and the reflecting element are located in the light source cavity, and the reflecting element comprises a mirror base and the reflecting layer is a silver-plated layer which is formed on the mirror base, and then the mirror base is thermally pressed on the substrate to form an integral structure which is bent along with the substrate to define the light source cavity for allowing the reflecting element to reflect the light from the light emitting unit, wherein the inert gas or the mixture of the inert gas and oxygen filled in the light source cavity and the heat dissipation cavity is able to prevent the silver-plated layer from sulfidation and blackening, wherein the substrate is bent to form a mounting portion and a wall attaching portion connected to the mounting portion, wherein the mounting portion of the substrate is formed with one or more thermal convection holes, which respectively communicate the light source cavity with the heat dissipation cavity to facilitate the heat convection between the light source cavity and the heat dissipation cavity, wherein the wall attaching portion facing an inner wall of the elongated glass tube is etched, a thickness of the wall attaching portion is 0.2-0.5 mm, and a groove depth formed by etching a copper sheet of the substrate is 0.03-0.1 mm.

* * * * *